United States Patent
Iwamura et al.

(10) Patent No.: US 7,461,226 B2
(45) Date of Patent: *Dec. 2, 2008

(54) MULTI-SITE REMOTE-COPY SYSTEM

(75) Inventors: Takashige Iwamura, Yokohama (JP); Takashi Oeda, Sagamihara (JP); Takao Satoo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/790,521

(22) Filed: Apr. 26, 2007

(65) Prior Publication Data

US 2007/0198791 A1    Aug. 23, 2007

Related U.S. Application Data

(63) Continuation of application No. 11/412,967, filed on Apr. 28, 2006, now Pat. No. 7,228,398, which is a continuation of application No. 10/676,121, filed on Oct. 2, 2003, now Pat. No. 7,130,974.

(30) Foreign Application Priority Data

Aug. 11, 2003   (JP) ............................. 2003-207004

(51) Int. Cl.
    *G06F 12/00*    (2006.01)
(52) U.S. Cl. ...................... 711/162; 711/100; 711/111; 711/112; 711/156; 707/204; 714/6; 714/15
(58) Field of Classification Search ................ 711/162, 711/100, 111, 112, 156; 707/204; 714/6, 714/15
See application file for complete search history.

(56) References Cited

U.S. PATENT DOCUMENTS

| | | | | |
|---|---|---|---|---|
| 5,555,371 A | 9/1996 | Duyanovich et al. | ........... | 714/13 |
| 5,615,329 A | 3/1997 | Kern et al. | ........... | 714/6 |
| 5,673,382 A | 9/1997 | Cannon et al. | ........... | 714/6 |
| 5,870,537 A | 2/1999 | Kern et al. | ........... | 714/6 |
| 5,937,414 A | 8/1999 | Souder et al. | ........... | 707/203 |

(Continued)

FOREIGN PATENT DOCUMENTS

| EP | 1 283 469 A2 | 2/2003 |
|---|---|---|
| JP | 2003-131917 | 5/2003 |

OTHER PUBLICATIONS

Schulman, Disaster Recovery Issues and Solutions, Hitachi Data Systems, Mar. 2002.

(Continued)

*Primary Examiner*—Stephen C Elmore
(74) *Attorney, Agent, or Firm*—Mattingly, Stanger, Malur & Brundidge, P.C.

(57) ABSTRACT

Two storage areas are created in a first storage subsystem, a synchronous remote copy is performed from a first storage area included in the first storage subsystem to a storage area included in a second storage subsystem, and an asynchronous remote copy is performed from a second storage area included in the first storage subsystem to a storage area included in a third storage subsystem. Besides, a computer accessing the first storage subsystem performs mirroring to both the storage areas included in the first storage subsystem.

8 Claims, 22 Drawing Sheets

U.S. PATENT DOCUMENTS

| | | | | |
|---|---|---|---|---|
| 5,995,980 | A | 11/1999 | Olsen | 707/201 |
| 6,209,002 | B1 | 3/2001 | Gagne et al. | 707/204 |
| 6,477,627 | B1 | 11/2002 | Ofek | 711/162 |
| 6,529,944 | B1 | 3/2003 | LeCrone | 709/211 |
| 6,587,935 | B2 | 7/2003 | Ofek | 711/162 |
| 6,622,152 | B1 | 9/2003 | Sinn | 707/204 |
| 6,804,676 | B1 | 10/2004 | Bains | 707/101 |
| 6,813,683 | B2 | 11/2004 | Tabuchi et al. | 711/112 |
| 6,842,825 | B2 | 1/2005 | Geiner et al. | 711/133 |
| 6,941,322 | B2 | 9/2005 | Bills | 707/103 |
| 6,959,369 | B1 | 10/2005 | Ashton | 711/162 |
| 6,968,349 | B2 | 11/2005 | Owen | 707/204 |
| 7,130,974 | B2 | 10/2006 | Iwamura et al. | 711/162 |
| 7,228,398 | B2 * | 6/2007 | Iwamura et al. | 711/162 |
| 2002/0143888 | A1 | 10/2002 | Lisiecki et al. | 709/214 |
| 2003/0051111 | A1 | 3/2003 | Nakano et al. | 711/162 |
| 2003/0105934 | A1 | 6/2003 | Kimura et al. | 711/167 |
| 2003/0145168 | A1 | 7/2003 | Lecrone et al. | 711/114 |
| 2003/0188233 | A1 | 10/2003 | Lubbers et al. | 714/100 |
| 2003/0200387 | A1 | 10/2003 | Urabe et al. | 714/113 |
| 2003/0204479 | A1 | 10/2003 | Bills et al. | 707/1 |
| 2003/0217031 | A1 | 11/2003 | Owen et al. | 707/1 |
| 2003/0220935 | A1 | 11/2003 | Vivian et al. | 707/102 |
| 2004/0024975 | A1 | 2/2004 | Morishita et al. | 711/147 |
| 2004/0030703 | A1 | 2/2004 | Bourbonnais et al. | 707/100 |
| 2004/0030837 | A1 | 2/2004 | Geiner et al. | 711/133 |
| 2004/0059738 | A1 | 3/2004 | Tarbell | 707/100 |
| 2004/0148443 | A1 | 7/2004 | Achiwa | 710/36 |
| 2004/0153719 | A1 | 8/2004 | Achiwa et al. | 714/5 |
| 2004/0172509 | A1 | 9/2004 | Takeda et al. | 711/162 |
| 2004/0230756 | A1 | 11/2004 | Achiwa et al. | 711/162 |
| 2004/0230859 | A1 | 11/2004 | Cochran et al. | 714/2 |
| 2004/0260736 | A1 | 12/2004 | Kern et al. | 707/204 |
| 2004/0267829 | A1 | 12/2004 | Hirakawa et al. | 707/200 |
| 2005/0015657 | A1 | 1/2005 | Sugiura et al. | 714/6 |
| 2005/0033827 | A1 | 2/2005 | Yamagami | 709/219 |
| 2005/0038968 | A1 * | 2/2005 | Iwamura et al. | 711/162 |
| 2005/0120093 | A1 | 6/2005 | Nakano et al. | 709/217 |
| 2007/0198791 | A1 * | 8/2007 | Iwamura et al. | 711/162 |

OTHER PUBLICATIONS

IBM TotalStorage Enterprise Storage Server Resiliency Family, 2002.

Disaster Tolerant Unix: Removing the Last Single Point of Failure, Illuminata, Inc., 2002.

C. Mikkelsen, et al "Addressing Federal Government Disaster Recovery Requirements with Hitachi Freedom Storage", Enterprise Storage Technology, Nov. 2002, pp. 1-18.

"Replication Guide and Reference V7: Document No. SC26-9920-00", IBM DB2 Guide, 2000, 455 pages.

"Replication Guide and Reference V8: Document No. SC27-1121-01", IBM DB2 Guide, 2003, 789 pages.

"IBM DB2 RepliData for z/OS, Version 3.1", IBM DB2 Guide, Mar. 2003, 2 pages.

IBM DB2 DataPropagator for z/OS, Version 8.1, IBM DB2 Guide, 2002, 4 pages.

* cited by examiner

MULTI-SITE REMOTE-COPY SYSTEM

The present application is a continuation of application Ser. No. 11/412,967, filed Apr. 28, 2006 now U.S. Pat. No. 7,228,398; which is a continuation of application Ser. No. 10/676,121, filed Oct. 2, 2003, now U.S. Pat. No. 7,130,974, the contents of which are incorporated herein by reference.

BACKGROUND OF THE INVENTION

The present invention relates to an information processing system including a storage subsystem, and particularly to a technique for transferring data stored in storage subsystems between plural information processing systems.

In an information processing system including a storage subsystem, in the case where a failure occurs in the storage subsystem due to a power failure, a natural disaster or the like, business operations using the information processing system are temporarily stopped, and in the worst case, data stored in the storage subsystem are lost. In order to avoid such a situation, there is a technique (hereinafter referred to as a "remote copy") for transferring and copying data stored in the storage subsystem of the information processing system to a storage subsystem provided at a remote place different from the information processing system.

The remote copy includes two kinds of remote copies, that is, a synchronous remote copy and an asynchronous remote copy, and they have merits and demerits, respectively. Specifically, in the synchronous remote copy, in the case where a write request is issued from a computer of an information processing system, after completing transfer of data accompanying the write request to a storage subsystem existing at a remote place, a storage subsystem of the information processing system makes a response to the computer as to the write request. Accordingly, in the synchronous remote copy, although data loss due to the failure is small, when a line delay between the storage subsystems is increased, the I/O performance between the computer and the storage subsystem deteriorates.

On the other hand, in the asynchronous remote copy, the storage subsystem of the information processing system executes the response to the computer as to the write request and the transfer of the data accompanying the write request to the remote place at independent timings. Accordingly, in the asynchronous remote copy, even if the distance between the storage subsystems is long, the performance is hardly lowered, however, the possibility of data loss becomes higher than the synchronous remote copy.

In recent years, in order to compensate the demerits of both remote copies, a remote-copy technique using plural information processing systems (hereinafter referred to as "sites") starts to be used.

For example, U.S. Pat. No. 6,209,002 discloses a system including a second site (including a second storage subsystem) near a storage subsystem included in a first site, and a third site (including a third storage subsystem) remote from the first site. In this system, two modes are alternately carried out.

Specifically, in a first mode, the synchronous remote copy is performed from the first storage subsystem to the second storage subsystem, and the remote-copied data are duplicated in the second storage subsystem. Incidentally, in this mode, a remote copy from the second storage subsystem to the third storage subsystem is not performed.

On the other hand, in a second mode, while the synchronous remote copy from the first storage subsystem to the second storage subsystem is continued, the asynchronous remote copy from the second storage subsystem to the third storage subsystem is performed. However, in this mode, the duplication of the data in the second storage subsystem is stopped.

Besides, "Addressing Federal Government Disaster Recovery Requirements with Hitachi Freedom Storage" by Claus Mikkelsen et al. also discloses a system including a second site (including a second storage subsystem) near a storage subsystem included in a first site, and a third site (including a third storage subsystem) remote from the first site. In this system, in order to perform a copy from the first storage subsystem to the third storage subsystem, two modes are alternately carried out.

Specifically, the synchronous remote copy is always performed from the first storage subsystem to the second storage subsystem. Besides, in a first mode, data written by a computer of the first site is duplicated in the first storage subsystem. Incidentally, in this mode, the remote copy from the first storage subsystem to the third storage subsystem is not performed.

On the other hand, in a second mode, the asynchronous remote copy from the first storage subsystem to the third storage subsystem is performed. However, in this mode, the duplication of the data in the first storage subsystem is stopped.

In the techniques disclosed in U.S. Pat. No. 6,209,002 and "Addressing Federal Government Disaster Recovery Requirements with Hitachi Freedom Storage" by Claus Mikkelsen et al., since the copy of data to the third storage subsystem is only periodically performed, there is a possibility that data lost becomes large, in the case where the first storage subsystem and the second storage subsystem simultaneously fail.

SUMMARY OF THE INVENTION

An object of the present invention is to provide an information processing system which lessens the quantity of data lost in a case where a first storage subsystem and a second storage subsystem simultaneously fail.

According to an embodiment of the present invention, in a system including plural sites, data are duplexed and are stored in plural storage areas of a first site, content of data update to a first storage area of them is transferred to a second site by a synchronous remote copy, and content of data update to a second storage area of them is transferred to a third site by an asynchronous remote copy.

Further, in a case where the first site becomes unusable by failure or the like, a processing, which has been performed in the first site, is continued in the second site or the third site, and the update data are sent to the other site, so that duplication of the data is performed.

Further, in a case where the first site is recovered, data are transferred from the second site or the third site to the first site, and then, the first site may resume a synchronous remote copy and an asynchronous remote copy.

DESCRIPTION OF THE PREFERRED EMBODIMENTS

Figure 1:
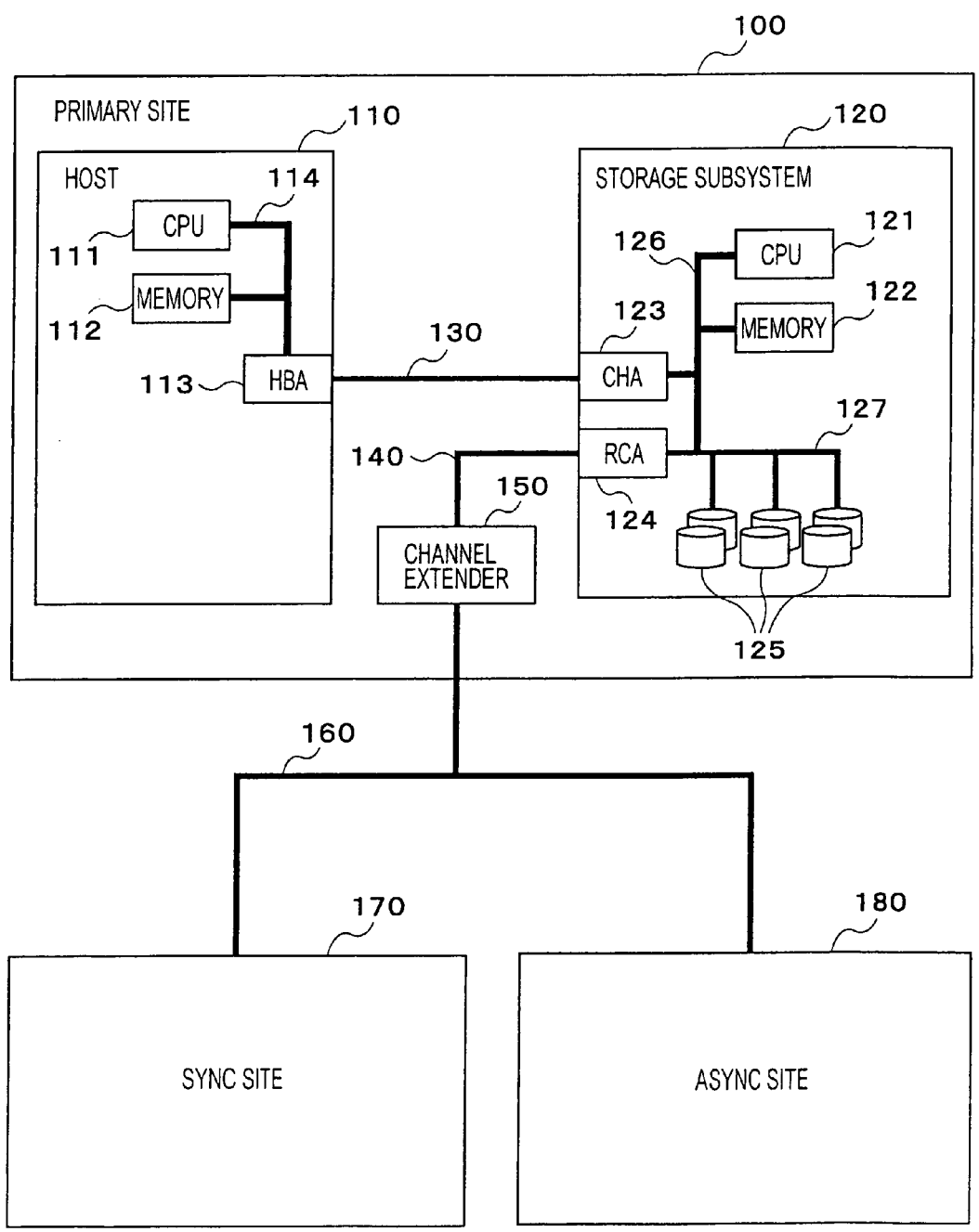
FIG. 1 is a view showing the hardware of a system.

FIG. 1 is a view showing a first embodiment.

An information system includes three sites, specifically, a primary site 100, a sync site 170 and an async site 180. The respective sites are mutually connected through a communication line 160. Incidentally, as described above, the site is an information processing system including a computer and a storage subsystem connected to the computer. Incidentally, it is needless to say that the configuration of the site is not limited to the following embodiments.

The primary site 100 is a site which is used by a user at a normal time, and an application used by the user is carried out in its computer.

The sync site 170 is a site existing at a place geographically different from the primary site 100. The async site 180 is a site existing at a place geographically different from the primary site 100 and the sync site 170. Incidentally, it is assumed that the distance between the primary site 100 and the sync site 170 is shorter than the distance between the primary site 100 and the async site 180, and the description will be made below.

The primary site 100 is an information processing system including a host 110, a storage subsystem 120 and a channel extender 150. The host 110 is a computer which performs the writing or reading (hereinafter referred to as an Input/Output (I/O)) of data to/from the storage subsystem 120. The storage subsystem 120 is an apparatus which stores data used by the host 110, and processes the I/O from the host 110. Incidentally, the other site has also the same configuration.

The host 110 and the storage subsystem 120 are connected through a communication line 130. Here, a fibre channel, Asynchronous Transfer Mode (ATM), Ethernet® or the like is conceivable as the communication line 130. As long as the I/O processing can be performed between the host 110 and the storage subsystem 120, any medium other than this may be adopted.

Besides, the storage subsystem 120 and the channel extender 150 are connected through a communication line 140. It is conceivable that the communication line 140 is formed of a fibre channel. As long as the foregoing objects can be achieved, any means other than this may be adopted.

The channel extender 150 is an apparatus which transfers information received from the storage subsystem 120 through the network 140 to the other site through the communication line 160, or which transfers information received from the other site through the communication line 160 to the storage subsystem 120 through the communication line 140. Incidentally, in the case where the communication line 140 and the communication line 160 can be directly coupled to each other, the channel extender 150 may not exist.

The host 110 includes a Central Processing Unit (CPU) 111 which executes an OS and programs such as applications, a memory 112, and an HBA (Host Bus Adapter) 113 which performs I/O to/from the storage subsystem 120 by using the communication line 130. These are mutually connected through an internal network 114. Here, plural CPUs 111, plural memories 112, and plural HUBs 113 may exist in the host 110, and the host 110 may include a device other than these. Besides, it is conceivable that the internal network 114 is constructed by an I/O bus or a memory bus. As long as equipments connected to this network can be made to communicate with each other, any structure other than this may be adopted.

The storage subsystem 120 includes a CPU 121 which processes I/O and carrying out programs which realizes access control and a remote copy described later, a memory 122, a Channel Adapter (CHA) 123, an RCA 124 and plural storage devices 125.

The CHA 123 is an adapter which connects the storage subsystem 120 to the communication line 130.

The RCA 124 (Remote Copy Adapter) is an adapter through which the storage subsystem 120 communicates with a storage subsystem of the other site via the communication line 140 and the channel extender 150.

Incidentally, the CHA 123 and the RCA 124 may exist as one adapter, and the communication line 130, the communication line 140 and the communication line 160 may be mutually the same communication line.

The storage devices 125 are devices which stores data transferred from the host 110, and for example, a Hard Disk Drive (HDD), a magneto-optical disk, a CD-ROM, a memory disk, a Flash ROM or the like is conceivable, however, any device other than this may be adopted. Besides, for improvement of reliability, the plural storage devices may be gathered together by a method such as RAID to form one virtual storage device. Further, after the foregoing virtual storage device or the area of the original storage devices is divided, this may be treated as a logical storage device. Incidentally, not shown here, the storage subsystem 120 may include a cache memory for caching data stored in the storage devices 125.

Besides, in FIG. 1, the communication line 160 has a star topology. As long as communication can be performed between the respective sites, topology other than this may be adopted.

Figure 2:
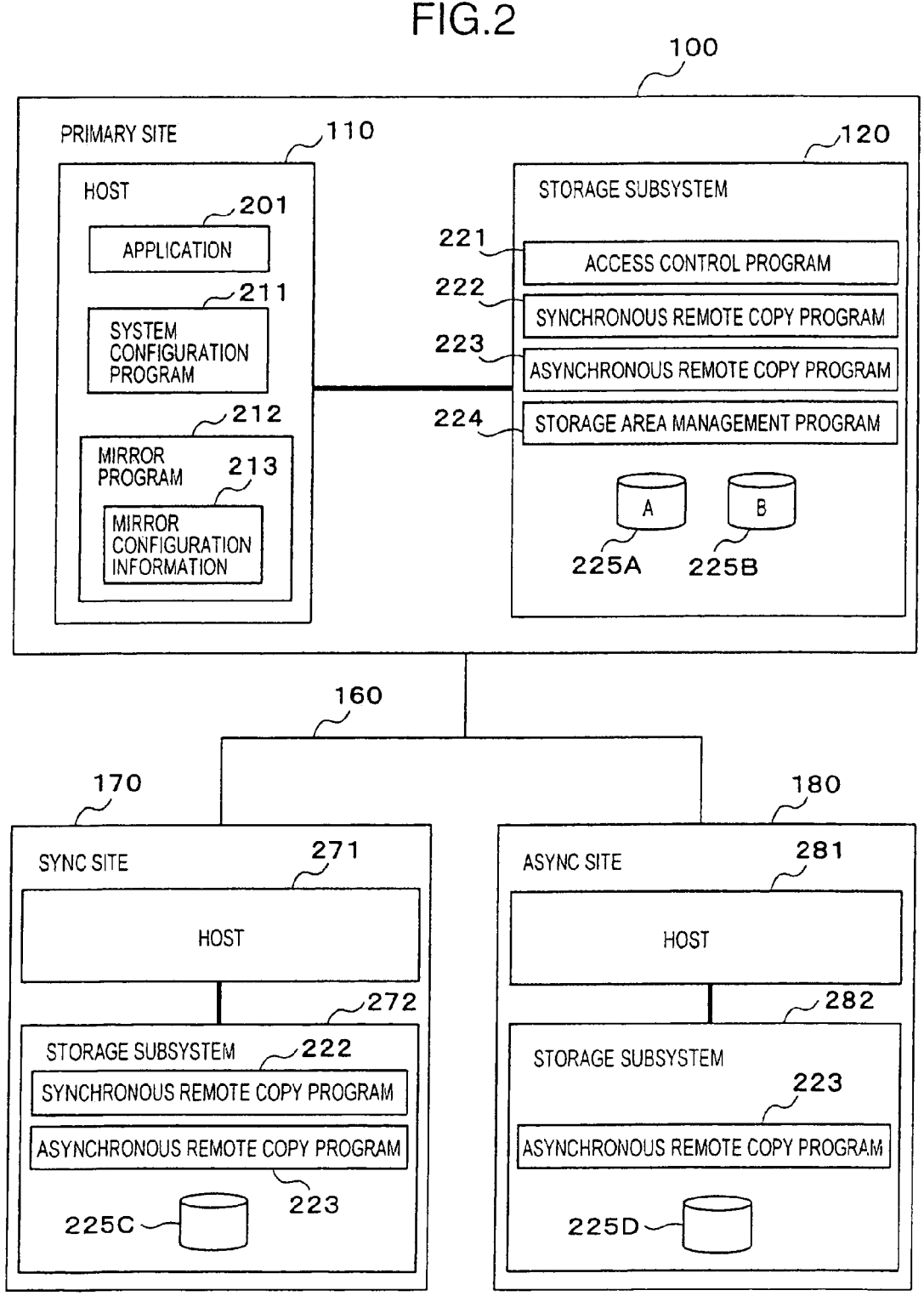
FIG. 2 is a block diagram showing a functional configuration of an embodiment.

FIG. 2 is a view showing the structure of programs and data included in the respective sites. These programs and data are stored in memories of respective subsystems. Incidentally, programs carried out by CPUs of the respective subsystems through these programs may be realized by dedicated hardware.

The host 110 of the primary site 100 includes an application program (hereinafter referred to as an "application") 201, a system configuration program 211, a mirror program 212, and a mirror configuration information 213.

The application 201 is specifically a database program or a Web server program. The user of the host 110 can write data into the storage subsystem 120 by causing the CPU 111 to execute the application 201. Incidentally, plural applications 201 may exist.

The mirror program 212 is a program carried out by the CPU 110 when the host 110 creates duplication (hereinafter referred to as "mirroring") of data in the storage subsystem 120 by using one or more storage areas provided to the host 110 by the storage subsystem 120. The mirror configuration information 213 includes configuration information necessary for performing the mirroring.

Here, the storage area is an area included in the storage device 125 and is formed of one or more blocks or tracks and the like as a unit, and it is, for example, a volume, a partition or a slice.

The storage subsystem 120 of the primary site 100 includes an access control program 221, a synchronous remote copy program 222, an asynchronous remote copy program 223, and a storage area management program 224.

The storage area management program 224 is a program carried out by the CPU 121 when configuration and management are performed in order to provide the storage devices 125 in the storage subsystem 120 as storage areas which become access targets of the host 110. Here, the storage area management program 224 is carried out when the storage subsystem 120 sets up a configuration to provide the storage area to the host 110 by using part or all of the unused areas of the storage subsystem 125, a configuration to delete an already configured storage area and to make it an unused one again, and a configuration (path configuration) as to an identifier to be used when the host 110 accesses the configured storage area.

Here, a storage area 225A and a storage area 225B of FIG. 2 are storage areas created on the basis of the instruction of the storage area management program 224.

Incidentally, the identifier used by the host 110 to access the storage area is called an external storage area identifier. An example of the external storage area identifier includes a set of a port number and Logical Unit Number (LUN) in the case of a system using a fibre channel, a set of a control unit number and a device number in the case where Enterprise Systems Connection (ESCON) ® or Fibre Connection (FI-CON) ® is used, and an Internet Protocol (IP) address and a port number in the case where an IP network is used. However, as long as the host 110 can be used as an identifier to access the storage area, information other than this or a combination of plural pieces of information may be used as the identifier.

The access control program 221 is a program carried out by the CPU 121 when an access request from the host 110 to the storage area in the storage subsystem 120 is controlled.

The synchronous remote copy program 222 is a program carried out by the CPU 121 when a synchronous remote copy is performed between a storage area in the storage subsystem 120 and a storage area existing in a storage subsystem different from the storage subsystem 120. In the subsequent description, a storage area as a copy origin is called a primary storage area, and a storage area as a copy destination is called a secondary storage area. Besides, a storage subsystem including a primary storage area is called a primary storage subsystem, and a storage subsystem including a secondary storage area is called a secondary storage subsystem.

When the synchronous remote copy is performed, in order to indicate and operate data of the two storage areas and the state of the copy, the primary and the secondary storage subsystems as a pair of the remote copy manage information indicating plural pair states (Simplex, Initial-Copying, Duplex, Suspend and Duplex-Pending). Incidentally, the information of the pair state includes information indicating that mutual storage areas have a pair relation of the remote copy.

The Simplex state is a state where a synchronous remote copy between the primary and the secondary storage areas is not started. The Duplex state is a state where the synchronous remote copy is started, an initialization copy described later is also completed, and the contents of the primary and the secondary storage areas become identical to each other. In the case of the synchronous remote copy, after the content of the writing performed to the primary storage area is reflected also in the secondary storage area, a normal completion message is returned to the host 110 having performed the writing. Accordingly, except for the storage area in the middle of the writing, the content of the data of the primary storage area and the content of the data of the secondary storage subsystem become identical to each other.

However, for example, in the case where a unique identifier is stored for each storage area, a case where the contents of the primary and the secondary storage areas are not identical may exist with respect to a specific portion of the storage area. Incidentally, the identity of the data as stated above is expressed as macroscopic identity in the subsequent description. Besides, when the pair is in the Duplex state, for example, in order to keep the identity in the primary and the secondary storage areas, a write request to the secondary storage area may be rejected, or a processing similar to this may be performed.

The Initial-Copying state is an intermediate state of transition from the Simplex state to the Duplex state. In this period, if necessary, the initialization copy (copy of data already stored in the primary storage area) from the primary storage area to the secondary storage area is performed. When the initialization copy is completed and the processing necessary for the transition to the Duplex state is ended, the pair state becomes the Duplex.

The Suspend state is a state where the content of the writing to the primary storage area is not reflected in the secondary storage area. In this state, the macroscopic identity of data of the primary and the secondary storage areas is not guaranteed. At a timing of instructions of an operator, a host, or a computer (not shown) which manages the storage subsystem, the pair state makes a transition from another state to the Suspend state. In addition to that, it is conceivable that in the case where the synchronous remote copy from the primary storage area to the secondary storage area becomes impossible, the pair state automatically makes a transition to the Suspend state.

In the subsequent description, the latter case is called a failure Suspend state. The typical cause of the failure Suspend state includes a failure of the primary and the secondary storage areas, a failure of the primary and the secondary storage subsystems, and a communication path failure between the primary and the secondary storage subsystems. Incidentally, in the case where the secondary storage subsystem of the Duplex state rejects a write request to the secondary storage area or performs a processing of a similar kind, the secondary storage subsystem may allow the write processing in the failure Suspend state. Further, the primary and the secondary storage subsystems may record writing positions to the primary and the secondary storage areas after the Suspend state.

Besides, the primary storage subsystem may reject the writing to the primary storage area at the time of the failure Suspend state. By doing so, even after the communication path between the primary storage subsystem and the secondary storage subsystem is disconnected, since the data of the primary and the secondary storage subsystems are identical, even in the case where a failure occurs in the primary storage subsystem after the disconnection, data loss can be prevented.

The Duplex-Pending state is an intermediate state of transition from the Suspend state to the Duplex state. In this state, in order to make the contents of the primary storage area and the secondary storage area macroscopically coincident with each other, copy of the data from the primary storage area to the secondary storage area is performed. After the identity of the data between the primary and the secondary storage areas is secured, the pair state becomes the Duplex. Incidentally, with respect to the copy of the data in the Duplex-Pending state, a differential copy for copying only a portion requiring update may be used by using write positions recorded by the primary and the secondary storage subsystems in the Suspend state.

Incidentally, in the above description, the Initial-Copying state and the Duplex-Pending state are made separate states. These may be gathered into one state and displayed on a screen of a management apparatus, or the state may be caused to make a transition.

The asynchronous remote copy program 223 is a program carried out by the CPU 121 when the asynchronous remote copy is performed between the storage area in the storage subsystem 120 and a storage area existing in a storage subsystem different from the storage subsystem 120. As already described, in the asynchronous remote copy, the reflection of the write data into the secondary storage area of the Duplex state is performed irrespectively (asynchronously) of the sending of the normal completion message of the writing to the host 110 of the storage subsystem 120.

In the case of the asynchronous remote copy, as a method of a data copy from the primary storage area to the secondary storage area, there is a following method.

For example, there is a method in which the primary storage subsystem creates a set (hereinafter referred to as a "log entry") of the written data and control information including an address of a storage area in which the data is written, each time the data is written, transfers this to the secondary storage subsystem, and makes it reflected in the secondary storage area. Further, as a developed form of this method, there is a method in which information indicating the time sequence of writing is contained in control information of a log entry, and when the log entry is made to be reflected in the secondary storage area, the information indicating the time sequence is used so that it is reflected in accordance with the time sequence.

Besides, as an efficient method of this method, there is a method in which in the case where writing to the same area of the primary storage area continuously occurs, the primary storage subsystem does not transfer a log entry concerning intermediate writing to the secondary storage subsystem, but transfers only a log entry concerning final writing. In the case where the primary storage subsystem includes a cache memory, there is also a method in which the primary storage subsystem adds a pointer indicating data written on the cache memory to the control information of the log entry, and the data copy for log entry creation is delayed until the data on the cache memory is updated by a different write processing.

Also at the time when the asynchronous remote copy is performed, the primary and the secondary storage subsystems manage pair states (Simplex, Initial-Copying, Duplex, Suspend, Duplex-Pending, and Suspending). The Simplex, Initial-Copying, Suspend and Duplex-Pending states are the same as those of the synchronous remote copy.

The Duplex state is basically the same as the case of the synchronous remote copy. However, since the reflection of the write data into the secondary storage area is performed asynchronously, the identity of data is different from the synchronous remote copy.

The Suspending state is an intermediate state of a transition from the Duplex state to the Suspend state. In the case of the asynchronous remote copy, the state makes a transition to the Suspend state through the Suspending state. Incidentally, in this state, the primary and the secondary storage subsystems may perform a processing to cause the log entry stored in memories of both the storage subsystems to be reflected in the secondary storage subsystem. Besides, in the case where recording of write positions to the primary and the secondary storage areas described in the Suspend state of the synchronous remote copy is performed, the primary and the secondary storage subsystems add the log entry, which could not be reflected, to the record of the writing positions.

A storage subsystem 272 of the Sync site 170 includes a synchronous remote copy program 222 and an asynchronous remote copy program 223. Besides, not shown, the storage subsystem 272 also includes a storage area management program 224, and a storage area 225C is a storage area created on the basis of the instruction of this program. Incidentally, a program (for example, an access control program 221) other than this may be contained in the storage subsystem 272.

A storage subsystem 282 of the async site 180 includes an asynchronous remote copy program 223. Similarly to the storage subsystem 272, the storage subsystem 282 also includes a storage area management program 224 (not shown), and a storage area 225D is a storage area created on the basis of the instruction of this program. Besides, a program (for example, an access control program 221) other than this may be contained in the storage subsystem 282.

Here, it is desirable that the storage area 225A, the storage area 225B, the storage area 225C and the storage area 225D have the same storage capacity when they are used in the remote copy. However, as long as the remote copy can be performed, the capacities of the respective storage areas may be different from each other.

Hereinafter, the operation of this embodiment will be described in brief. Incidentally, a case where the term "program" becomes the subject word means that a CPU of a subsystem in which each program is stored performs an actual processing. Further, a recitation that data is exchanged between programs means that inter-program communication (programs handle the same data through a common memory and the like) used in a computer is actually carried out.

In this embodiment, data for writing, which are created by the application 201 on the host 110, are duplicated by the mirror program 212 on the host 110, and are sent (mirroring) to the two storage areas included in the storage subsystem 120.

In the primary storage subsystem of the Primary site, the synchronous remote copy program 222 uses one storage area of the two storage areas to perform a copy processing, and performs the synchronous remote copy of the data stored in the storage area to the storage area of the Sync site. Besides, the asynchronous remote copy program 223 uses the other storage area to perform a copy processing, and performs the asynchronous remote copy of the data stored in the other storage area to the storage subsystem of the async site.

Further, in the case where the primary site is damaged, the processing of the application is resumed by one of the sync site and the async site. In the case of resuming on the sync site, the storage area copied by the synchronous remote copy is used. On the other hand, the case of resuming on the async site includes a case where the storage area copied by the asynchronous remote copy is used and a case where the application is resumed after the differential data of the storage area are copied into the async site from the sync site.

Hereinafter, the details of the respective processings in this embodiment will be described.

First, the mirroring carried out by the CPU 111 of the host 110 will be described. The CPU 111 executes the mirror program 212 to store the same data into two or more storage areas included in the storage subsystem 120, and provides the plural storage areas as one imaginary storage area (hereinafter referred to as a "virtual storage area") to the application.

Incidentally, in the case where a communication path failure occurs between the primary site and the sync site, the storage subsystem 120 can reject the writing of the host 110 to the storage area 225A. In this case, the mirror program 212 which receives this rejection notification may notify the write failure to the application 201 without performing the writing to the storage area 225B. Incidentally, in the subsequent description, a set of one or more storage areas used for the mirroring is called a mirror group.

Figure 8:
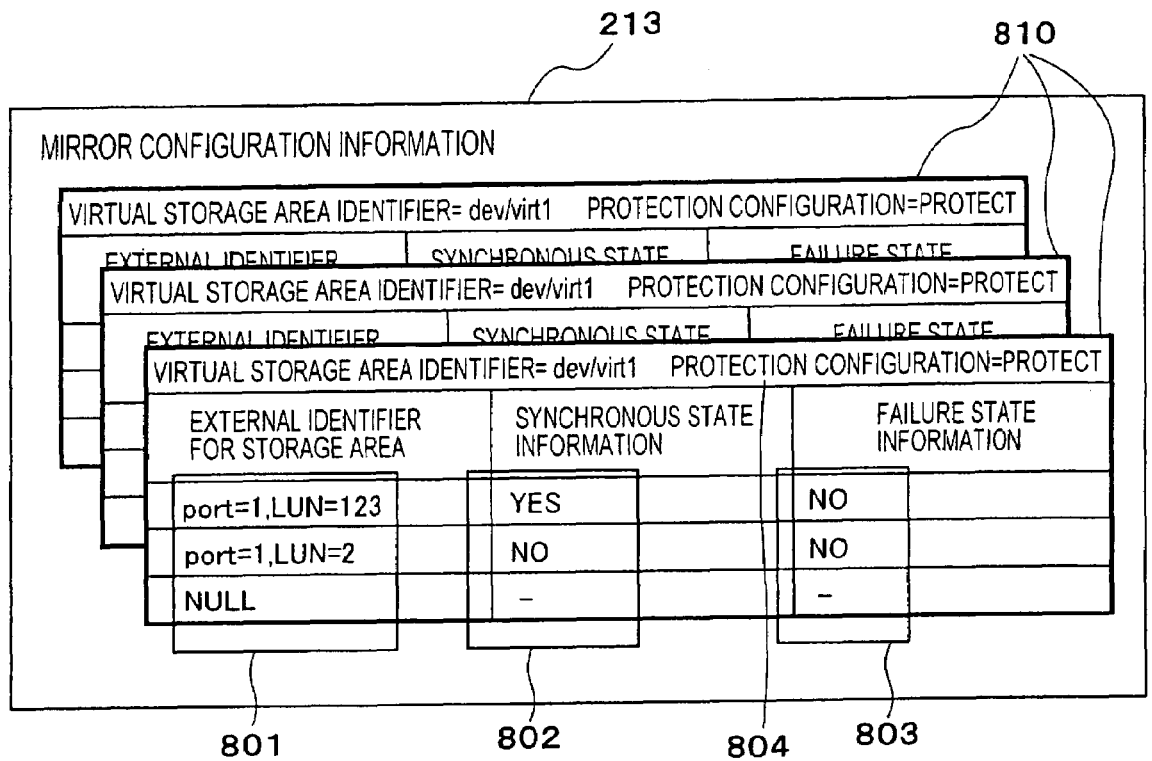
FIG. 8 is a view showing configuration information.

FIG. 8 is a block diagram showing the content of the mirror configuration information 213 used when the host 110 manages the virtual storage areas (composed of the mirror group).

The mirror configuration information 213 includes entries 810 in each of which information relating to the configuration of one virtual storage area is registered and the number of which is equal to the number of virtual storage areas. Each of the entries 810 includes a field 801 which registers an external identifier for storage area assigned to a storage area belonging to a mirror group of the virtual storage area, a field 802 which registers synchronous state information, a field 803 which registers a failure state, and a field 804 which registers protection configuration information.

The synchronous state information is information indicating a synchronous state of data in the case where a storage area is newly added to the mirror group. Since data of the storage area belonging to the mirror group is not duplicated in the storage area immediately after addition to the mirror group, the synchronous state information to this storage area becomes information indicating that synchronization is not achieved. Thereafter, the copy of data from the storage area already belonging to the mirror group to this new storage area is completed, and at a stage where there occurs a state in which synchronization to data of the other storage area is achieved, the synchronization state information corresponding to this storage area becomes information indicating that synchronization is achieved. Besides, information indicating that synchronization is not achieved is set to the storage area which comes to have a failure state.

The failure state information is information indicating a failure state of a storage area corresponding to an entry. Here, the failure state includes a state where the storage area becomes unusable, and a state where the storage area is write-protected by the failure Suspend write-protect configuration of the synchronous remote copy.

The protect configuration information is information indicating that when a storage area belonging to the mirror group is write-protected by the failure Suspend write-protect configuration of the synchronous remote copy, update to the storage area from the application 201 is rejected.

Figure 9:
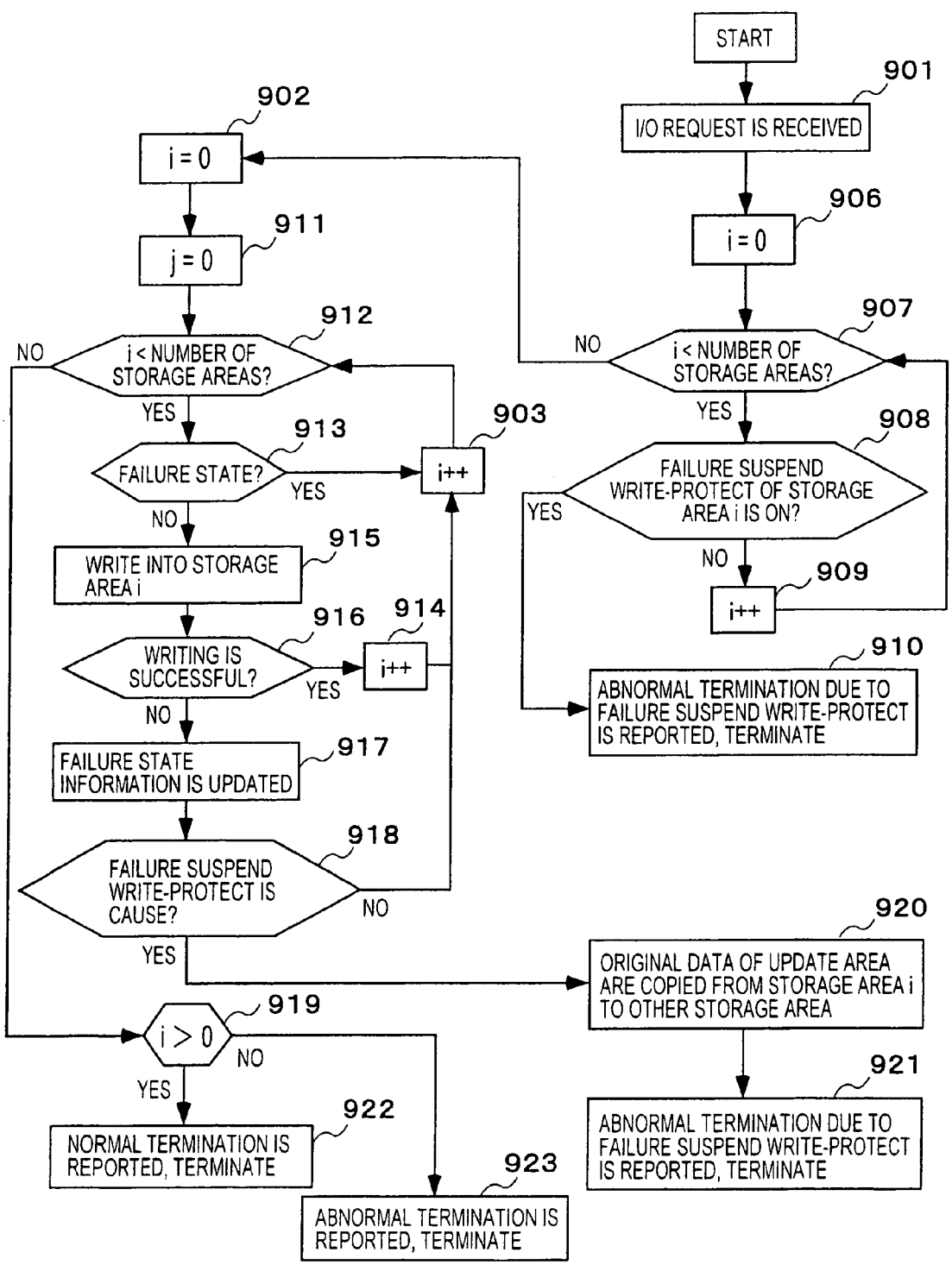
FIG. 9 is a flowchart showing a procedure of a write processing in the primary site in the case where storage area synchronous protection is effective.

FIG. 9 is a view showing the flow of a write processing to the storage area belonging to the mirror group. This processing is started by instructions of the user or the like of the system irrespective of transfer of data to the other site from the primary storage subsystem.

The host 110 starts the processing of a write request of data to the virtual storage area, which occurs at the application 201 (step 901).

When the processing of the write request is started, the host 110 checks the failure state information of the field 803 corresponding to the respective storage areas belonging to the mirror group, and checks whether there is a storage area which is write-protected by the failure Suspend write-protect configuration (steps 906, 907, 908 and 909).

If there is a storage area which is write-protected, the host 110 reports abnormal termination of the writing to the application 201, and terminates the processing. Incidentally, in the report, that the failure Suspend write-protect is the cause of the abnormal termination may be reported (step 910).

In the case where there is no write-protect storage area, the host 110 initializes the value of a variable i which indicates the storage area belonging to the mirror group and the value of a variable j which indicates the number of storage areas in which writing is successful to zero (steps 902 and 911).

Thereafter, the host 110 first checks failure state information registered in the field 803 with respect to the respective storage areas belonging to the mirror group, and performs data writing if it is not in the failure state. Besides, if it is in the failure state, the variable i is incremented, and the procedure proceeds to a processing to a next storage area (steps 912, 913, 903 and 915).

The host 110 checks the write result of data at step 915, and if the writing is successful, the variables i and j are incremented, and the procedure proceeds to a processing to a next storage area. If it is failed, the failure state information of the field 803 corresponding to the storage area is rewritten, and it is recorded that a failure occurs (steps 916, 914 and 917).

Thereafter, if the reason of the write failure is due to the failure Suspend write-protect, the host 110 instructs the storage subsystem 120 to copy the data stored in the address area as a write object from the failure Suspend write-protect storage area to the storage area in which writing is already completed, and returns the data of the storage area belonging to the mirror group into the state before the data writing. Incidentally, the copy destination may be restricted to the storage area, which has been already updated before the failure Suspend write-protect occurs, in order to raise the efficiency of the copy (steps 918 and 920).

After the processing of step 920, the mirror program 212 reports the abnormal termination of the writing to the application 201 and terminates the processing. Incidentally, in the report, that the failure Suspend write-protect is the cause may be reported (step 921).

When it is judged at step 912 that the processings to all storage areas belonging to the mirror group are terminated, the host 110 checks the variable j, and confirms whether the number of storage areas where writing is normally terminated is one or more. If such a storage area exists, the mirror program 212 reports the normal termination to the application 201, and if not, the mirror program reports the abnormal termination (steps 919, 922 and 923).

By performing the above processing, the host 110 updates the data to the mirror group. Besides, by performing the above processing, in the case where a storage area in which update data is not reflected in the storage area 225C of the secondary storage subsystem exists in the mirror group, the mirror program 212 can return the write abnormal termination to the application during the mirror processing, that is, data update can not be performed to the other storage area of the mirror group. The processing as stated above is called a failure protection processing. Configuration to perform the failure protection processing is called failure protection configuration. Incidentally, at the above step, even if the failure protection configuration is not performed, that is, writing of data to a storage area of the mirror group is not permitted, writing of data to the other storage area may be permitted.

Figure 6:
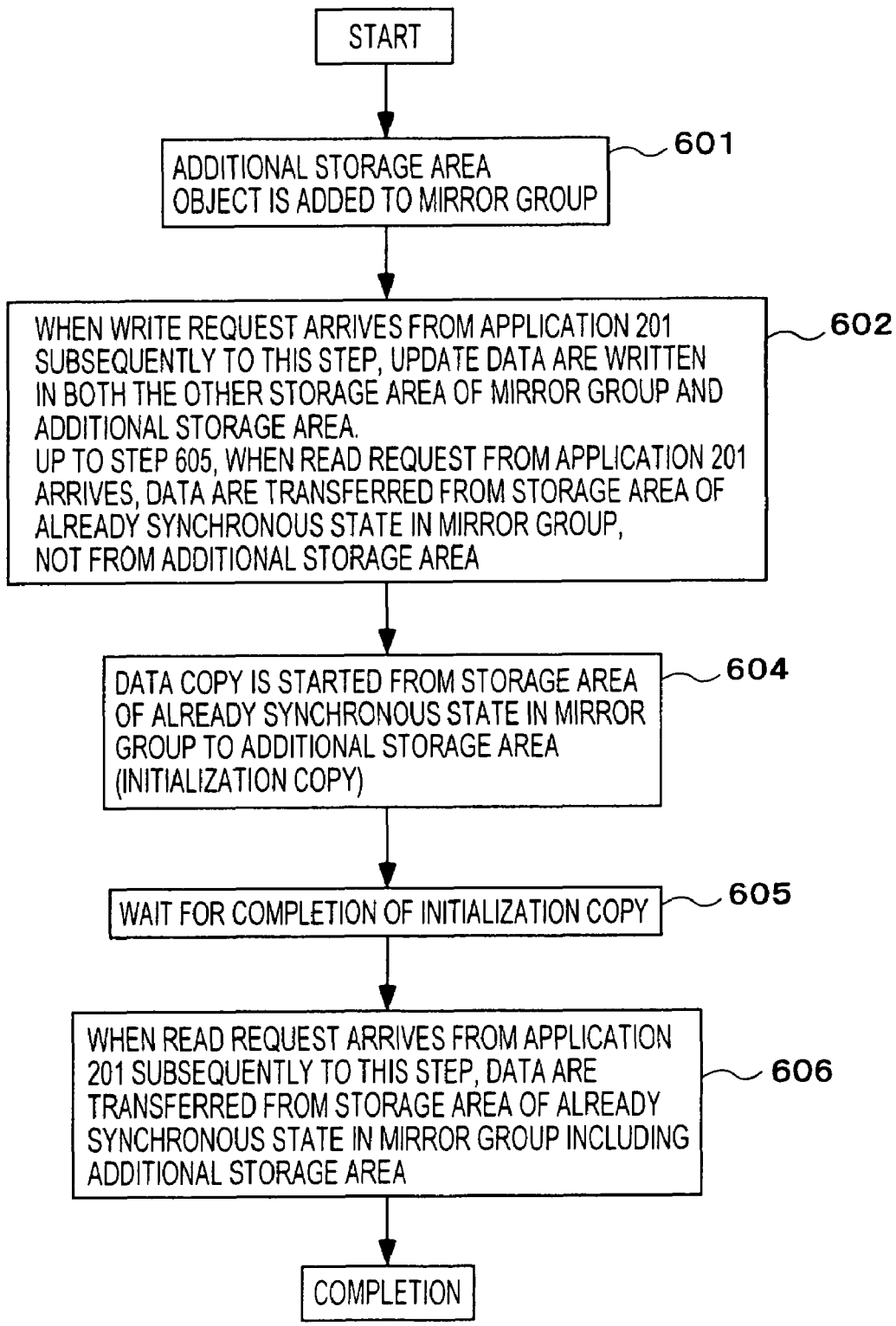
FIG. 6 is a flowchart showing a procedure of adding a storage area to a mirror group.

FIG. 6 is a view showing a processing procedure in a case where a storage area is newly added to a mirror group in the host 110. Incidentally, the addition instruction (including information of an external identifier for storage area) of the storage area is given from the user of the host 110, a program on the host 110, or a management computer to the mirror program 212, a computer other than this may give the addition instruction to the mirror program 212. Besides, it is conceivable that the addition instruction is given at the point of time when the use of the host 110 is started. However, this invention is not limited to this.

First, the host 110 adds the external identifier for the storage area assigned to the additional storage area to the field 801 of the entry 810 corresponding to the mirror group of the addition. Besides, the host writes information indicating that synchronization is not achieved into the field 802 corresponding to the added field 801, and writes information indicating a normal state into the field 803 (step 601).

Thereafter, in the case where a write request occurs in the application 201, the host 110 writes data into both the other storage area in the mirror group and the additional storage area.

Besides, before synchronization is achieved between the additional storage area and the data stored in the existing mirror group, in the case where a read request occurs in the application 201, the host 110 reads out data from the storage area which is in the mirror group and is already in the synchronous state, not from the additional storage area (step 602).

Thereafter, the host 110 instructs the storage subsystem 120 to copy data from the storage area of the synchronous state in the mirror group to the additional storage area. Incidentally, it is conceivable that the data copy is intended for all the storage areas. In the case where an area in which a copy is not necessary can be previously known by bitmaps or the like, the copy of the area may not be performed (step 604).

After the copy of data to the additional storage area is completed, the host 110 updates the information of the field 802 corresponding to the additional storage area to the information indicating the synchronous state (step 605).

Thereafter, in the case where a read request occurs in the application 201, the host 110 transfers data from the storage area, which is already in the synchronous state, in the mirror group including the additional storage area (step 606).

Next, an initial configuration processing (hereinafter referred to as an "initialization processing") of the synchronous and the asynchronous remote copies of the system in this embodiment will be described. Incidentally, this processing is carried out by the CPU 111 on the basis of the program of the host 110. However, it may be carried out when an administrator of the host 110 directly inputs configuration information to the storage subsystem, or may be carried out by a computer other than that.

Figure 3:
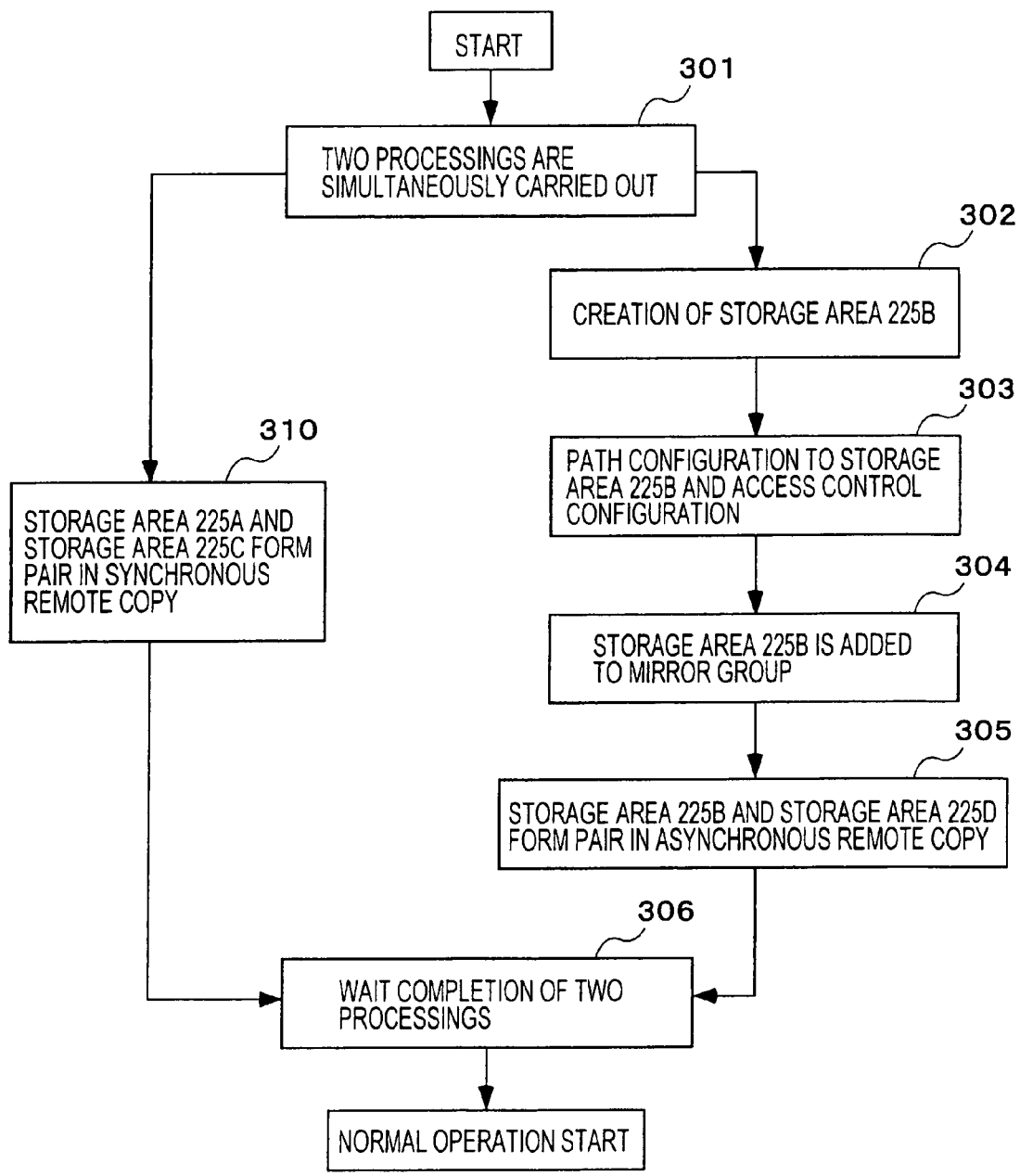
FIG. 3 is a flowchart showing a system initialization procedure of the embodiment.

FIG. 3 is a view showing a processing procedure of the initialization processing. Incidentally, as an initial state of the system, a state is assumed in which the storage area 225A is already created, path configuration is already set, and information indicating that the storage area 225A singly forms the mirror group is registered in the mirror configuration information 213. Hereinafter, the primary storage subsystem performs a left processing step and a right processing step of FIG. 3 in parallel.

The host 110 instructs the primary storage subsystem to create the storage area 225B, and sets up a configuration such as a path configuration and an access control configuration. As a preferred embodiment, the access limitation configuration of the storage area 225B is made the same as the storage area 225A. However, if the storage area 225B can be accessed from the host 110, an access control configuration other than this may be set up.

Thereafter, the host 110 adds the storage area 225B to the mirror group in accordance with the foregoing processing procedure (step 304).

Thereafter, the primary storage subsystem starts the execution of the asynchronous remote copy program 223 in accordance with the instruction of the host 110, starts the initialization copy in the asynchronous remote copy from the storage area 225B to the storage area 225D existing in the async site, and waits until the pair state becomes the Duplex (step 305).

On the other hand, the primary storage subsystem executes the synchronous remote copy program 222 in according with the instruction of the host 110, starts the initialization copy in the synchronous remote copy from the storage area 225A to the storage area 225C existing in the sync site, and waits until the pair state becomes the Duplex (step 310).

Thereafter, the primary storage subsystem waits for the termination of both the processing of the step 305 and the processing of the step 310 (step 306).

Incidentally, in the above processing, the already created storage area 225A is used as the primary storage area of the synchronous remote copy. However, the newly added storage area 225B may be used as the primary storage area of the synchronous remote copy. In this case, the operations to the storage area 225A and the storage area 225B have only to be exchanged, and the following may be the same as the above procedure. Further, the storage area 225B is previously created before this processing and is registered in the mirror group, and the processing of the steps 302 to 304 may be omitted.

Besides, the start instruction of the synchronous or the asynchronous remote copy from the host 110 at the initialization processing includes information to specify a primary storage area, a secondary storage area, a primary storage subsystem and a secondary storage subsystem, that is, information to specify a pair in the remote copy. Alternatively, as another embodiment, information to specify the pair is sent to the primary and the secondary storage subsystems from the host 110 or a computer for management, and the start instruction of the remote copy may include only the identifier to specify the pair.

From the above processing, preparation of execution (hereinafter referred to as "normal operation") of the synchronous or the asynchronous remote copy in this system is completed.

Next, an operation of the system of this embodiment at the time of the normal operation will be described.

Figure 4:
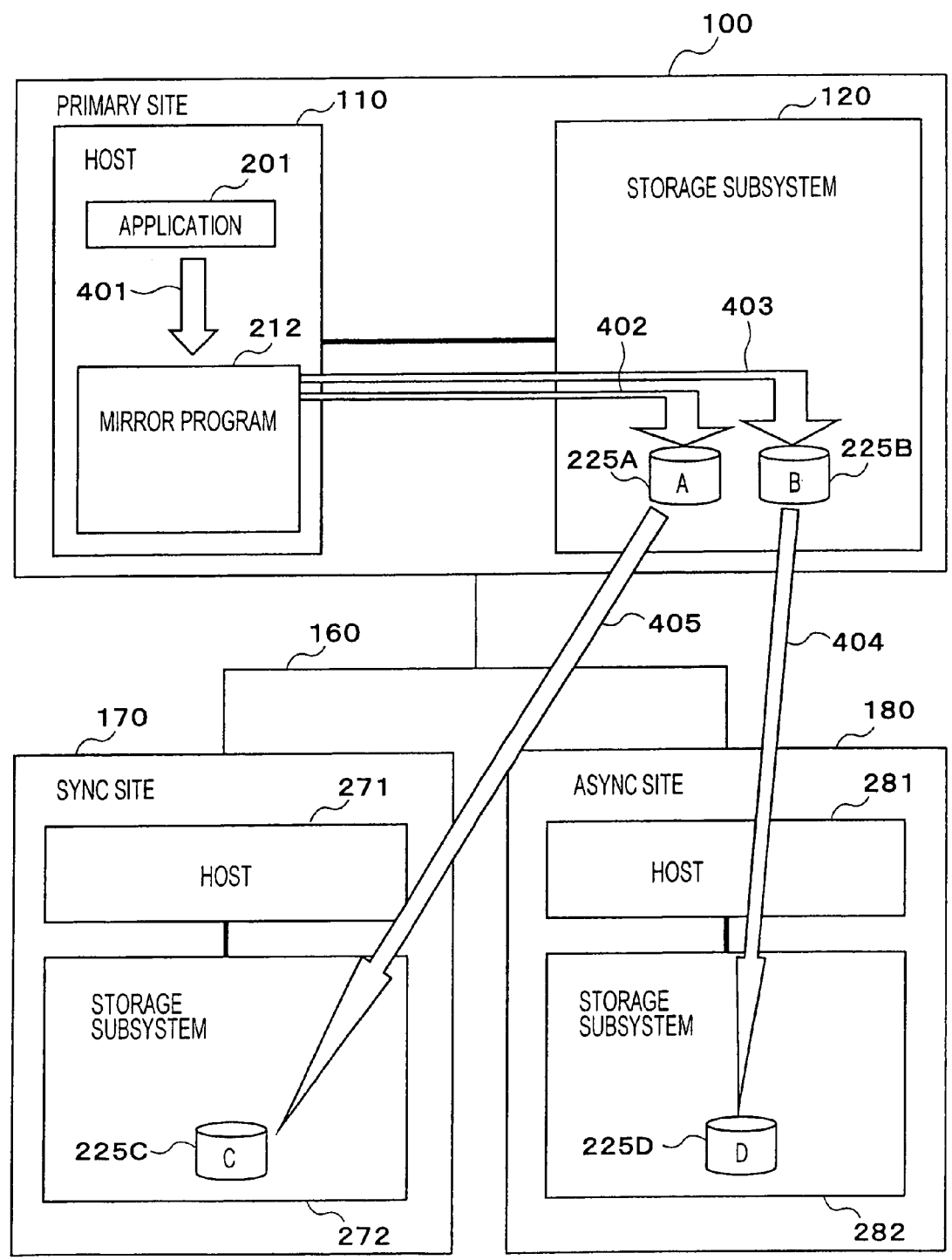
FIG. 4 is a block diagram showing a normal operation state of the embodiment.

FIG. 4 is a schematic view conceptually showing the movement of data at the operation of the system. Incidentally, in this drawing, an arrow 401 to an arrow 405 indicate the flow of the data corresponding to a write request sent from the host 110. Incidentally, in this drawing, it is assumed that the initialization processing shown in FIG. 3 is already completed.

First, when update of data of a virtual storage area is request by the application 201 of the host 110, the host 110 starts the execution of the mirror program 212, and starts the processing of data for update (hereinafter referred to as "update data") (arrow 401).

In order to send the update data to all the mirror groups included in the virtual storage areas, the host 110 duplicates the update data, and transfers it to the storage area 225A and the storage area 225B as indicated by the arrow 402 and the arrow 403. The sequence of the transfer is arbitrary. Besides, the actual update procedure of the data is as described above.

When receiving the update data to the storage area 225A, the primary storage subsystem makes the update data reflected in the storage area 225A, and transfers the update data to the storage area 225C. Incidentally, the reflection into the storage area 225A may be actually the completion of writing to a cache memory included in the primary storage subsystem (arrow 405).

When the reflection of the update data into the storage area 225C is terminated, the primary storage subsystem returns a normal termination message of the writing into the storage area 225A to the host 110.

On the other hand, in the case where the update data is transferred to the storage area 225B, the primary storage subsystem writes the update data into the storage area 225B, and returns a normal termination message of the writing into the storage area 225B to the host 110. Thereafter, the normal storage subsystem transfers the update data written in the storage area 225B to the storage area 225D asynchronously with the normal termination message (arrow 404).

The mirror program 212 which have received the write normal termination message of the writing of the update data into both the storage area 225A and the storage area 225B returns a write normal termination message to the application 201.

Incidentally, transfer of the update data from the host 110 to the storage area 225A and the storage area 225B may be performed at timings independent of each other.

Next, in this embodiment, a resume procedure of an application in another site in a case where a system stop occurs by a failure or the like of the primary site 100, and a return procedure in a case where the primary site 100 is recovered will be described.

Incidentally, if mirroring in the host 110 is performed while the protection information configuration is on, even in the case where the primary site 100 is stopped by a failure after the communication between the storage subsystem 120 of the primary site 100 and the storage subsystem 272 of the sync site is stopped, the host 110 does not lose the update data on which write completion is notified to the application 201. This is because in the situation where the communication between the storage subsystems becomes impossible, the host 110 stops the write processing from the application.

Figure 10:
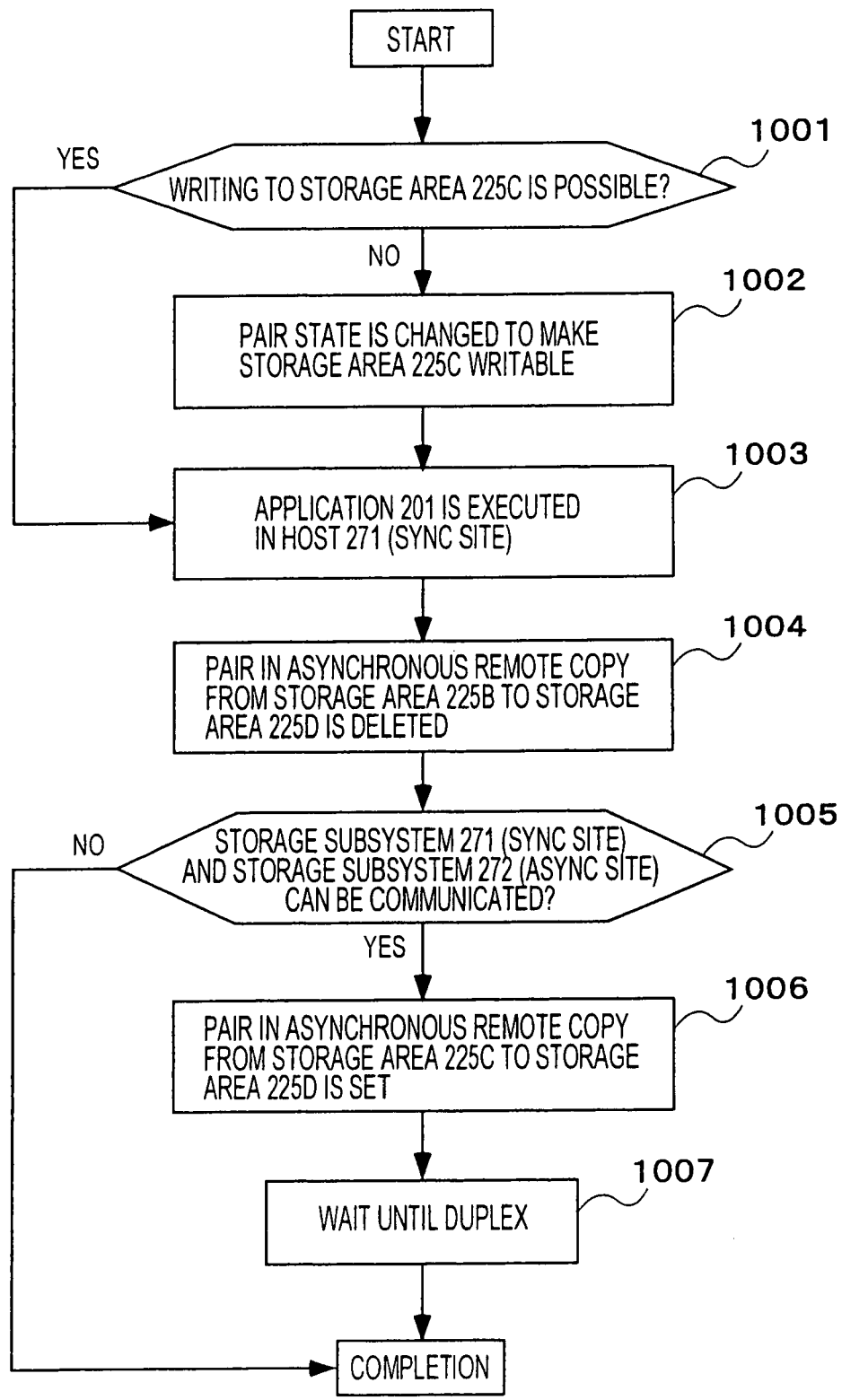
FIG. 10 is a flowchart showing a procedure of resuming an application processing in the sync site in the case where a failure occurs in the primary site.

FIG. 10 is a view showing a procedure of resuming an application, which has been carried out in the primary site 100, by the sync site 170 when the system of the primary site 100 is stopped.

In the state where writing to the storage area 225C can not be performed according to the pair state of the synchronous remote copy from the storage area 225A to the storage area 225C, the host 271 of the sync site 170 changes the pair state of the synchronous remote copy included in the storage subsystem 272, and enables writing to the storage area 225C. Incidentally, as the change of the information of the pair state, it is conceivable that the pair state is changed to the Simplex (steps 1001 and 1002).

Thereafter, the application 201 is executed in the host 271, and the processing is resumed by using the storage area 225C (step 1003).

Next, the host 281 instructs the storage subsystem 282 to cause the pair state of the asynchronous remote copy from the storage area 225B to the storage area 225D to transit to the Simplex (step 1004).

At this time, if the communication is possible between the storage subsystem 272 and the storage subsystem 282, the host 271 instructs the storage subsystem 272 to set up a pair configuration by the asynchronous remote copy program 223 from the storage area 225C to the storage area 228D and to start the asynchronous remote copy, and waits until the pair state becomes the Duplex (steps 1005, 1006 and 1007).

By this, the application is restarted in the sync site, and the update data by the application is transferred to the async site.

Figure 5:
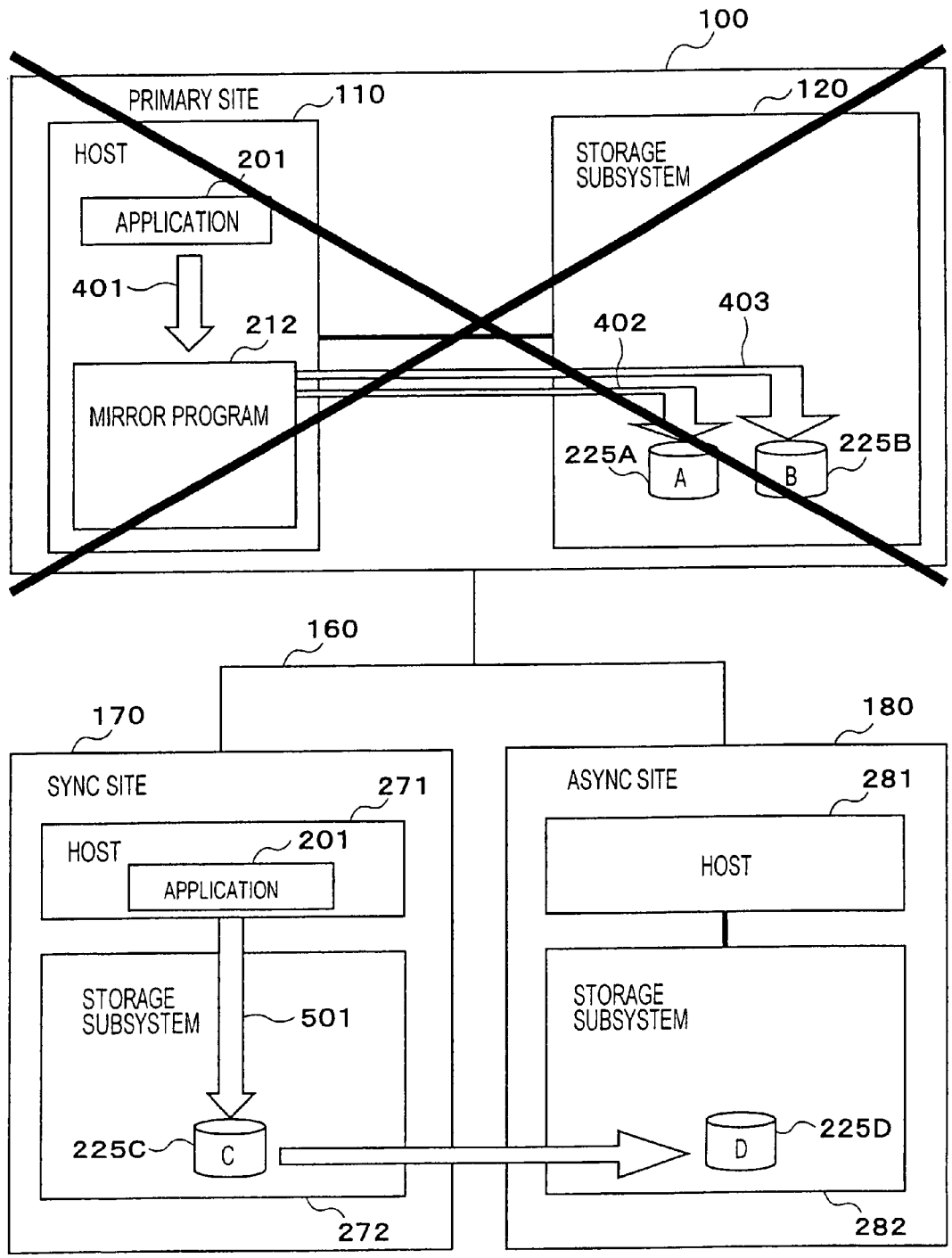
FIG. 5 is a block diagram showing a state in a case where when a primary site is stopped by failure, an application processing is resumed in a sync site.

FIG. 5 is a block diagram showing a system state after the application is resumed in the sync site 170 as a result of the processing procedure of FIG. 10.

The storage subsystem 272 performs the asynchronous remote copy, so that the update (arrow 501) of data issued by the host 271 of the sync site 170 to the storage area 225C is reflected in the storage area D228 asynchronously (arrow 502).

Accordingly, even in the case where the sync site 170 is stopped by a disaster after the execution of the application is resumed in the sync site 170, by using the storage area 225D of the async site 180, there is a possibility that the latest data updated in the sync site is lost. However, it becomes possible to avoid loss of data other than that.

Figure 11:
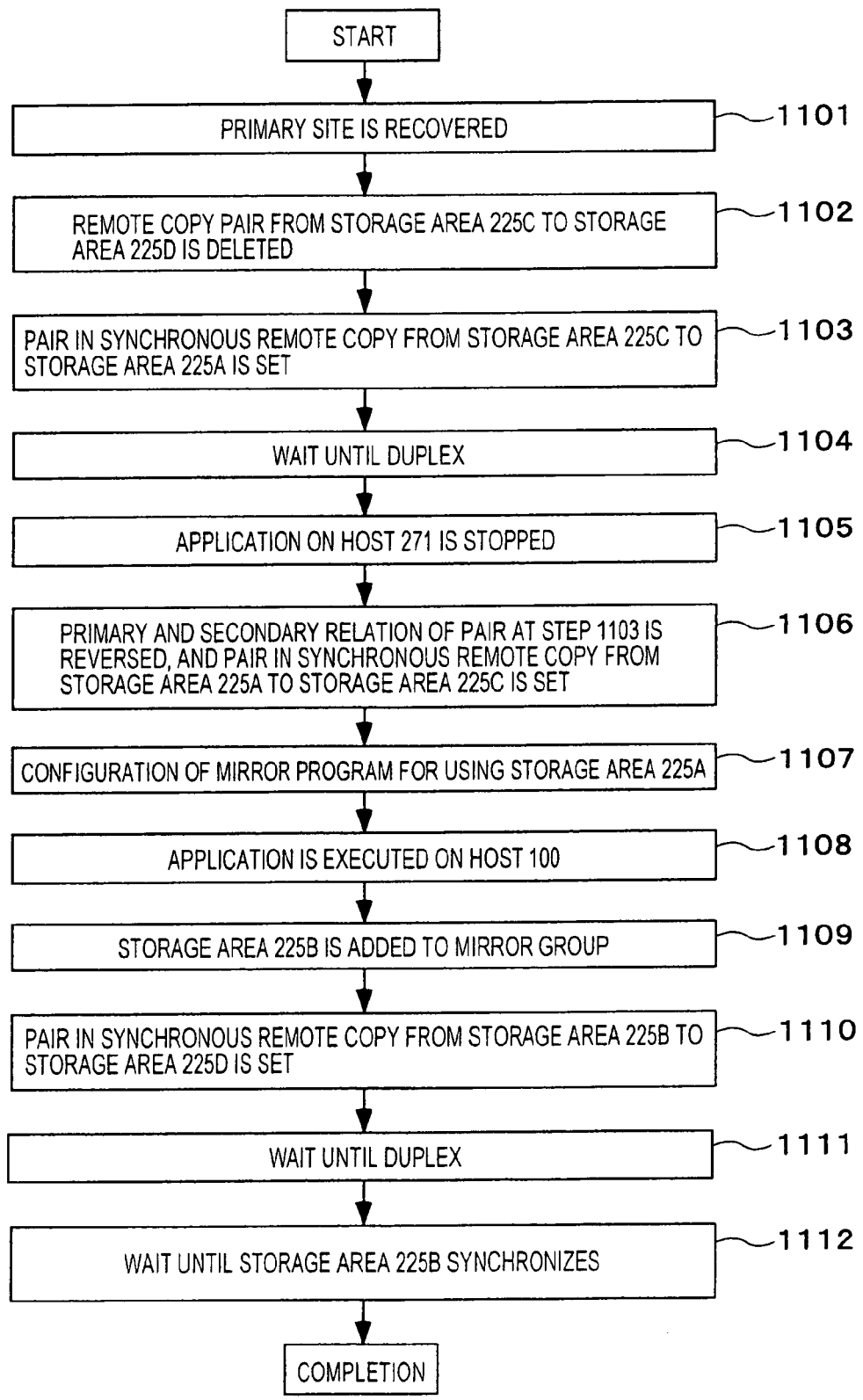
FIG. 11 is a flowchart showing a return procedure to a normal operation state when the primary site is recovered after the application processing is resumed in the sync site.

FIG. 11 is a view showing a return procedure from a state where an application processing is resumed in the sync site 170 to a normal operation state (operation of the primary site 100).

First, the primary site 100 is recovered. At this time, it is assumed that the configuration of the mirror configuration information 213 of the storage area 225A is not set in the host 110, and the pair information does not also exist in the storage subsystem 120 (step 1101).

Thereafter, the host 271 or the host 282 instructs the storage subsystem 272 or the storage subsystem 282 to cause the pair state of the asynchronous remote copy from the storage area 225C to the storage area 225D to transit to the Simplex (step 1102).

Thereafter, on the basis of the instruction of the host 271, the storage subsystem 272 starts the synchronous remote copy from the storage area 225C to the storage area 225A, and waits until the pair state becomes the Duplex (steps 1103 and 1104).

Next, the user or the administrator stops the application 201 on the host 271 (step 1105).

Thereafter, the host 271 or the host 110 reverses the primary and secondary relation of the pair created at the steps 1103 and 1104, and instructs the storage subsystem 120 to perform the synchronous remote copy from the storage area 225A to the storage area 225C. If such a processing can not be carried out by the synchronous remote copy program 222, the user temporarily deletes the information of the pair state of the storage areas 225A and 225C, and sets a pair in the reverse direction. In that case, since the storage area 225A and the storage area 225C have the same data, the initialization copy of the synchronous remote copy in the reverse direction may be omitted (step 1106).

At this point of time, since configuration information for using the storage area 225A is not registered in the host 110, the user sets up a configuration to provide a mirror group including the storage area 225A as a virtual storage area to the application 201 (step 1107).

Thereafter, the user restarts the application 201 on the host 100, and resumes the processing using the storage area 225A (step 1108).

The host 110 adds the storage area 225B to the mirror group set at the step 1107 (step 1109).

The storage subsystem 120 starts the asynchronous remote copy from the storage area 225B to the storage area 225D in accordance with the instruction of the host 110 (step 1110).

Thereafter, the storage subsystem 120 waits until the data of the storage area 225B coincides with the data content of the storage area 225A, and the pair state of the step 1110 becomes the Duplex.

Incidentally, in the foregoing procedure, the stop of the application 201 at the step 1105 may be carried out before this step, and the restart of the application 201 at the step 1108 may be carried out after this step.

The processing in the primary site is resumed by the foregoing processing, and the consistency of data between the synchronous and the asynchronous remote copies can also be recovered.

Figure 12:
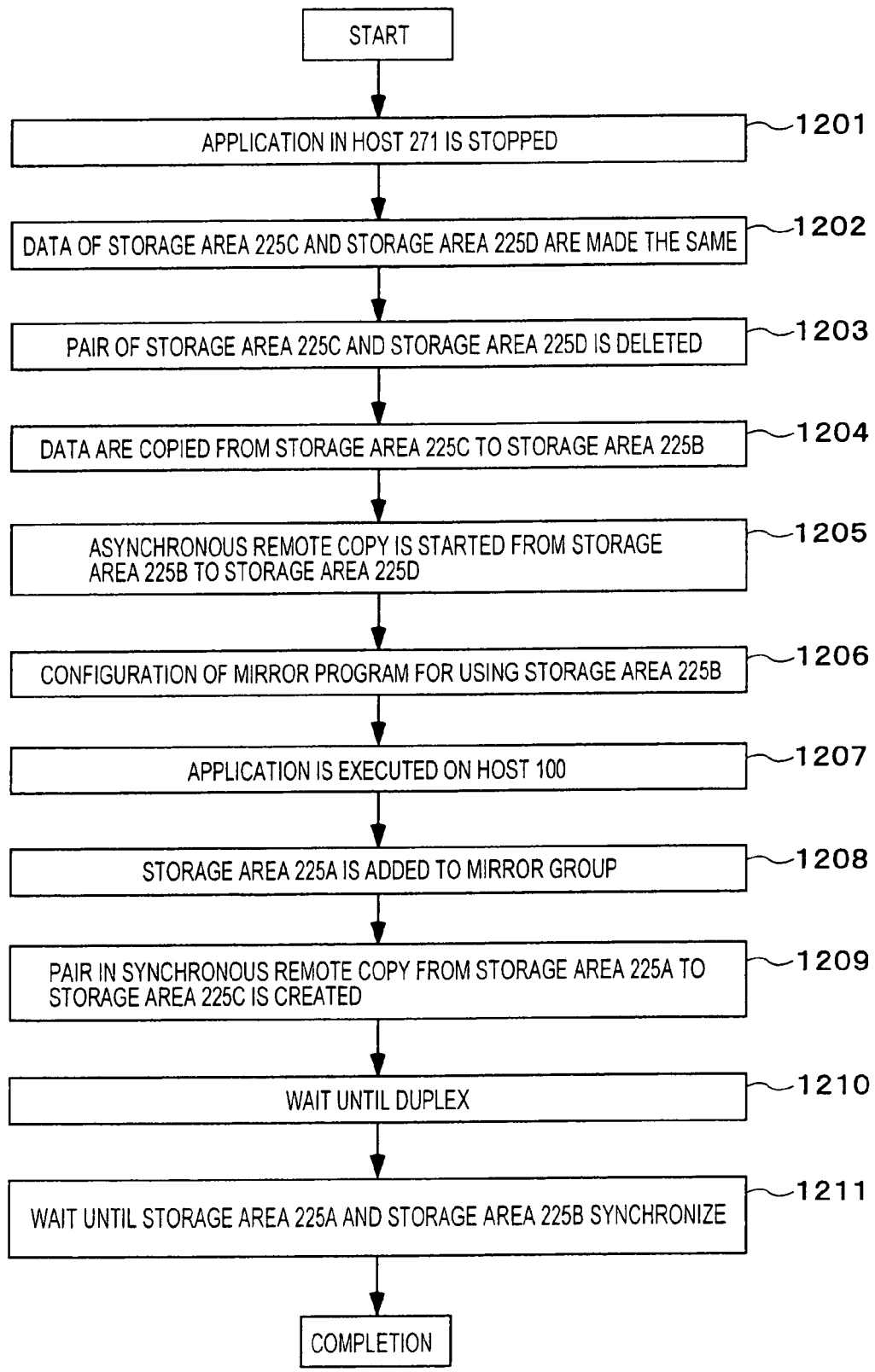
FIG. 12 is a flowchart showing a return procedure to a normal operation state when the primary site is recovered after the application processing is resumed in the sync site.

FIG. 12 is a view showing another example of a return procedure from a state where an application processing is resumed in the sync site 170 to a normal operation state (operation of the primary site 100). Incidentally, in the following processing, it is assumed that the storage areas 225A and 225B are already configured in the primary site (however, the configuration of the mirror group is not set yet).

First, the user stops the execution of the application 201 in the host 271 (step 1201).

The host 281 and the host 271 confirm that the contents of the data included in the storage area 225C and the storage area 225D are synchronous, and instructs the storage subsystems 282 and 272 to delete the information of the pair state (steps 1202 and 1203).

The host 271 instructs the storage subsystem 272 to copy the data from the storage area 225C to the storage area 225B (step 1204).

Thereafter, the storage subsystem 120 starts the asynchronous remote copy from the storage area 225B to the storage area 225D on the basis of the instruction of the host 110 and the like. Incidentally, since the same data are already stored in the storage area 225B and the storage area 225D, the initialization copy in the asynchronous remote copy may be omitted (step 1205).

At this point of time, since mirror configuration information for using the storage area 225B does not exist in the host 110, the user sets up a configuration to provide the mirror group including the storage area 225B as the virtual storage area to the application 201 (step 1206).

The user restarts the application 201 of the host 110, and resumes the processing using the storage area 225B (step 1207).

Thereafter, the user adds the storage area 225A to the mirror group of the step 1206 (step 1208).

Thereafter, the storage subsystem 120 starts the synchronous remote copy from the storage area 225A to the storage area 225C in accordance with the instruction of the host 110 (step 1209).

The host 110 waits until the data of the storage area 225A becomes consistent with the data content of the storage area 225B, and the pair state of the step 1209 becomes the Duplex (steps 1210 and 1211).

Incidentally, when the restart of the application at the step 1207 is performed after the step 1209, the initialization copy of the step 1209 can be omitted. In that case, the host 110 instructs the storage subsystem 272 to copy the data to the storage area, which becomes the storage area 225A, as well as the storage area 225B at the step 1204, and the copy at the time of creation of the mirror group and at the time of addition of the storage area 225A at the step 1208 may be omitted.

When the primary site is recovered by the foregoing two processings, in the system, the resumption can be first made from either of the asynchronous remote copy and the synchronous remote copy.

Figure 13:
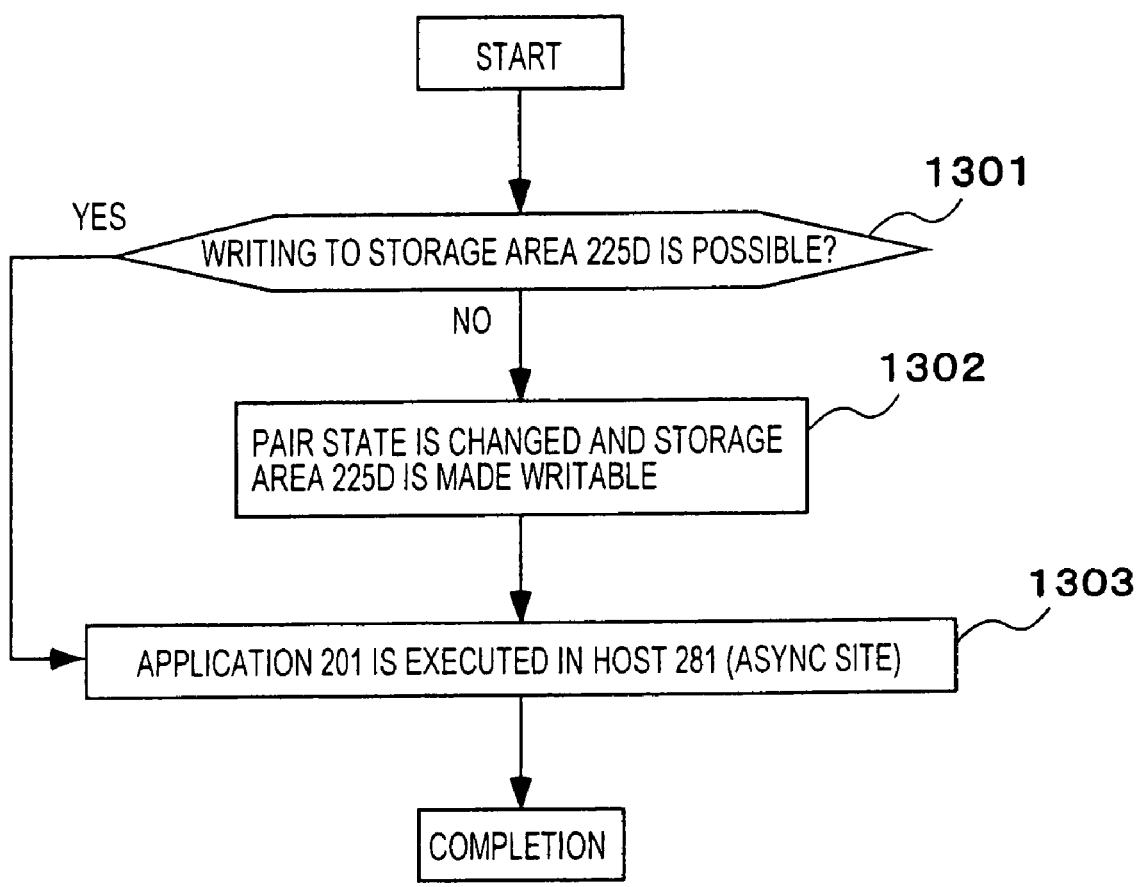
FIG. 13 is a flowchart showing a processing procedure in which an application processing is resumed in an async site when the primary site and the sync site are stopped by failure.

FIG. 13 is a view showing a procedure to resume the execution of an application in the async site 180 at the time of the failure of the primary site.

In case the pair state information of the asynchronous remote copy from the storage area 225B to the storage area 225D included in the storage subsystem 282 indicates that writing to the storage area 225D can not be performed, the host 281 instructs the storage subsystem 282 to change the information of the pair state, and enables writing to the storage area 225D. Incidentally, as an example of a method of changing the information of the pair state, it is conceivable that the pair state is changed to the Simplex (steps 1301 and 1302).

The application 201 is executed in the host 281, and the processing is resumed by using the storage area 225D. Incidentally, at the time of the resumption, a recovery processing by the application 201 may be performed. Specifically, in the case of a database, (1) since inconsistency due to the existence of a write-back buffer occurs in the DB, restoration is performed by using a transaction log, or (2) the writing of transaction not committed is returned to a state before the transaction by using a transaction log (step 1303).

By this, the execution of the application can be resumed in the async site.

Figure 14:
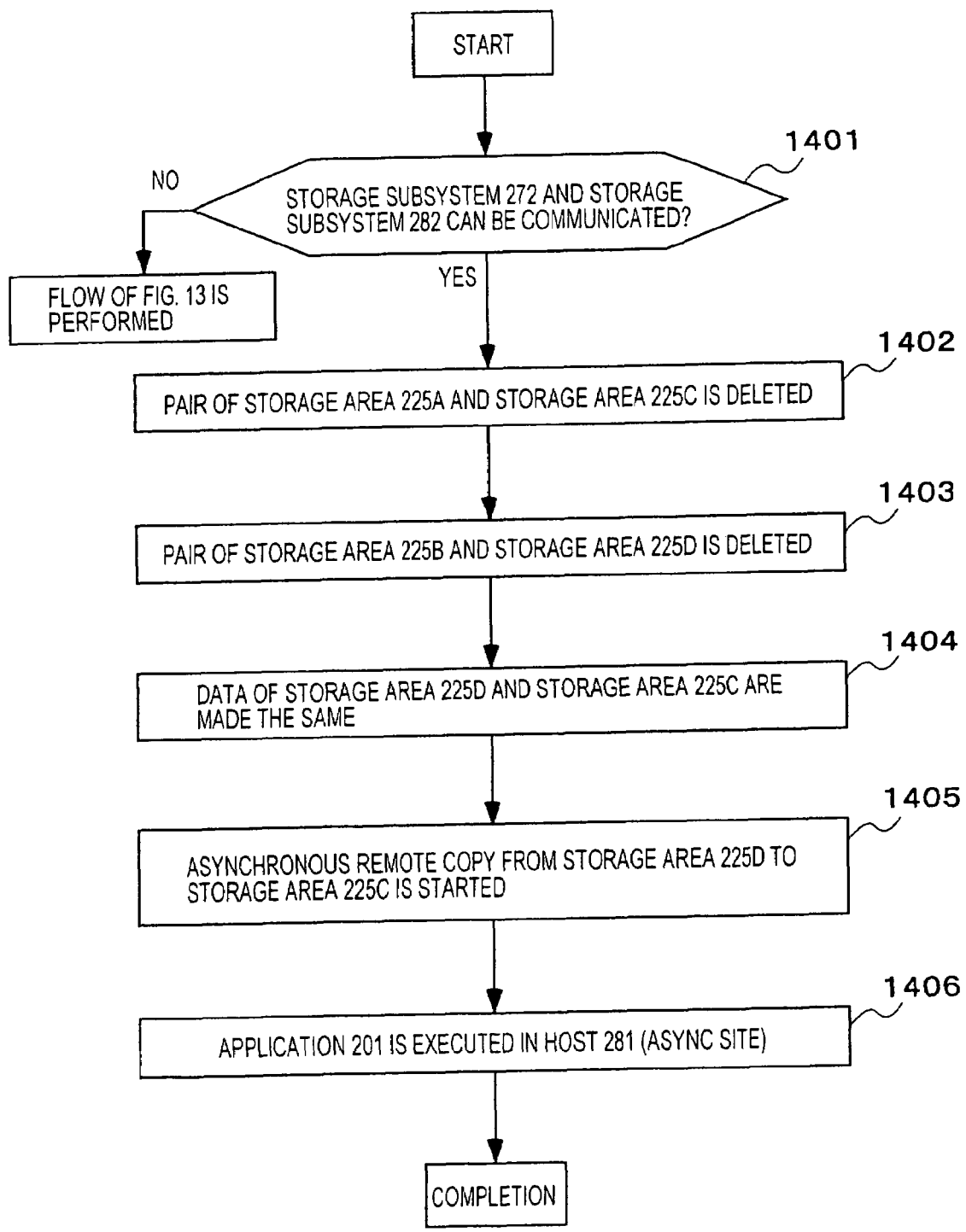
FIG. 14 is a flowchart showing a procedure in which the application processing is resumed in the async site when the primary site is stopped by failure.

FIG. 14 is a view showing a procedure example to resume the application 201 on the async site 180 by using the data of the storage area 225C of the sync site 170 when the primary site 100 is stopped by a failure or the like.

The host 271 and/or the host 281 confirm whether communication can be performed between the storage subsystem 272 and the storage subsystem 282, and if communication can not be performed, instead of this procedure, for example, the resumption procedure in the async site 170 is performed (step 1401).

The host 271 and the host 281 instruct the storage subsystems 272 and 282 to cause information of the pair state of the synchronous remote copy from the storage area 225A to the storage area 225C and the pair state of the asynchronous remote copy from the storage area 225B to the storage area 225D to effect a transition to the Simplex (steps 1402 and 1403).

Thereafter, the host 271 or the host 281 instructs the storage subsystem 272 or the storage subsystem 282 to make the data of the storage area 225D identical to the data of the storage area 225C.

As a specific method, there is a method in which the asynchronous remote copy is performed from the storage area 225C to the storage area 225D, and waiting is performed until the pair state becomes the Duplex, a method of performing the synchronous remote copy, or a method in which in a case where update to the storage area 225C has not been performed, a copy is performed using a normal I/O command. Besides, when differential information between the storage area 225C and the storage area 225D can be used, this may be used (step 1404).

Next, the host 281 instructs the storage subsystem 282 to perform the asynchronous remote copy from the storage area 225D to the storage area 225C, and waits until data contents of both become identical. Incidentally, by using the fact that the data contents of the storage area 252C and the storage area 225D are already identical to each other at the above step, the initialization copy of the asynchronous remote copy may be omitted (step 1405).

The application 201 is executed in the host 281, and the processing is resumed by using the storage area D227. Incidentally, at the resumption, a recovery processing by the application 201 may be performed (step 1406).

By the above processing, data is copied to the async site from the sync site in which the newest update data is stored in the primary site, and the execution of the application can be resumed in the async site.

Figure 15:
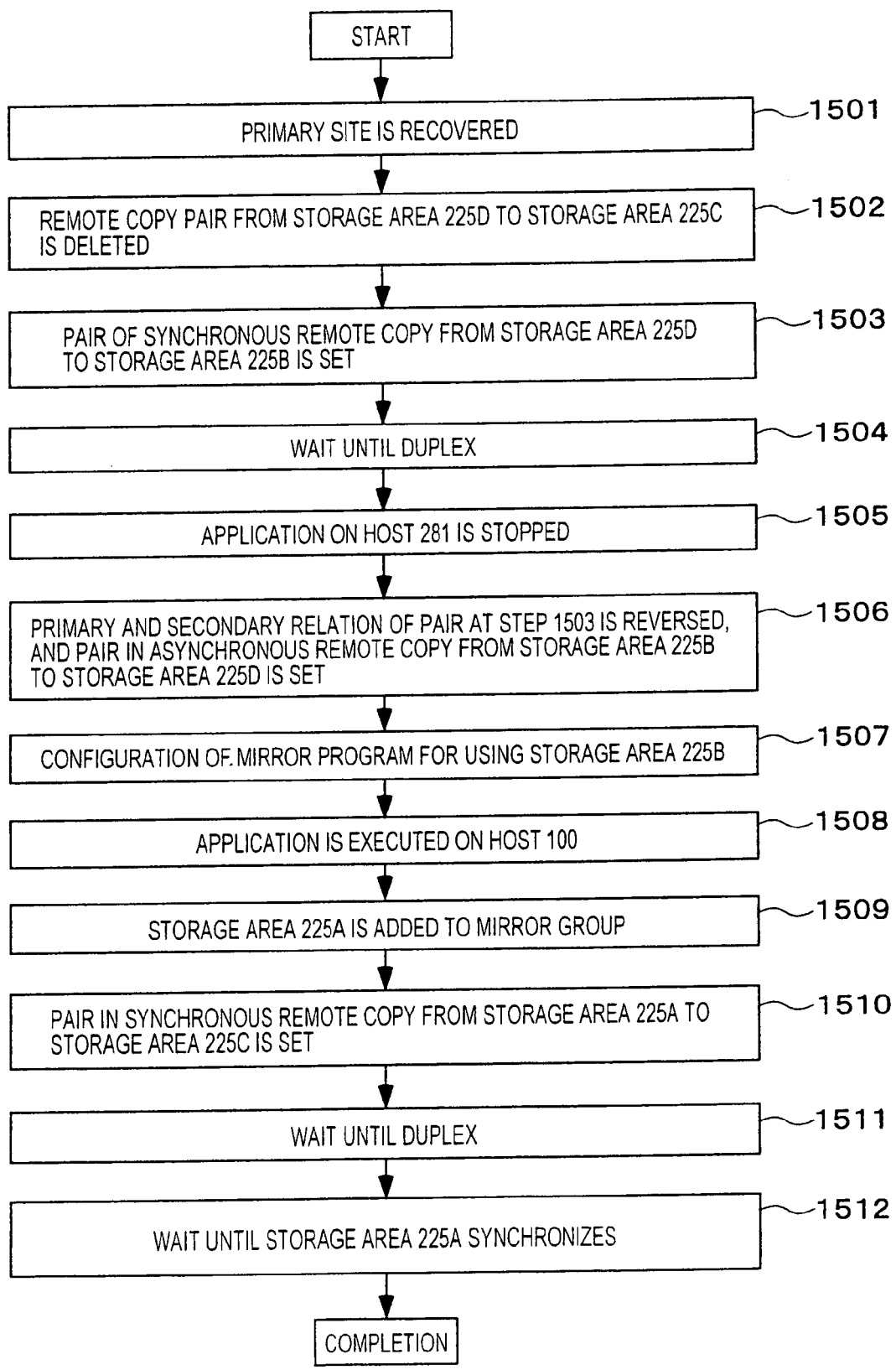
FIG. 15 is a flowchart showing a return procedure to a normal operation state when the primary site and the sync site are recovered after the application processing is resumed in the async site.

FIG. 15 is a view showing an example of a procedure to return to a normal operation state (application execution in the primary site) after an application is resumed in the async site 180.

First, the primary site 100 is recovered. At this time, it is assumed that pair information of the remote copy does not exist in the storage subsystem 120 with respect to the storage area 225A to the storage area 225D and the configuration of the mirror configuration information 213 of the storage area 225A is not set in the host 110 (step 1501).

Next, the host 281 instructs the storage subsystem 282 to delete, if exists, the information of the pair state of the asynchronous remote copy from the storage area 225D to the storage area 225C (step 1502).

Next, the host 281 instructs the storage subsystem 282 to start the asynchronous remote copy from the storage area 225D to the storage area 225B, and waits until the pair state becomes the Duplex (steps 1503 and 1504).

The application 201 on the host 281 is stopped (step 1505).

Thereafter, the host 110 reverses the primary and secondary relation of the pair created at the steps 1503 and 1504, and instructs the storage subsystem 120 to perform the asynchronous remote copy from the storage area 225B to the storage area 225D. In the case where such a processing can not be performed in the execution of the asynchronous remote copy program 223, the host 110 instructs storage subsystem 120 to transit to the Simplex after the pair state is changed to the Split, and to set the pair in the reverse direction. In that case, since the storage area 225B and the storage area 225D have the same data, the initialization copy of the synchronous remote copy in the reverse direction may be omitted (step 1506).

Since the configuration for using the storage area 225B does not exist in the host 110, the host 110 sets up a configuration to provide a mirror group including the storage area 225B as a virtual storage area to the application 201 (step 1507).

The application 201 on the host 100 is restarted and the processing using the storage area 225B is resumed (step 1508).

Next, the host 110 adds the storage area 225A to the mirror group of the step 1507 (step 1509).

The storage subsystem 120 starts the synchronous remote copy from the storage area 225A to the storage area 225C on the basis of the instruction of the host 110 (step 1510).

Thereafter, the host 110 waits until the data of the storage area 225A coincides with the data of the storage area 225B and the pair state of the step 1510 becomes the Duplex (steps 1511 and 1512).

Incidentally, the stop of the application 201 at the step 1505 may be carried out before the processing at this step, and the restart of the application 201 at the step 1508 may be carried out after the step.

Figure 16:
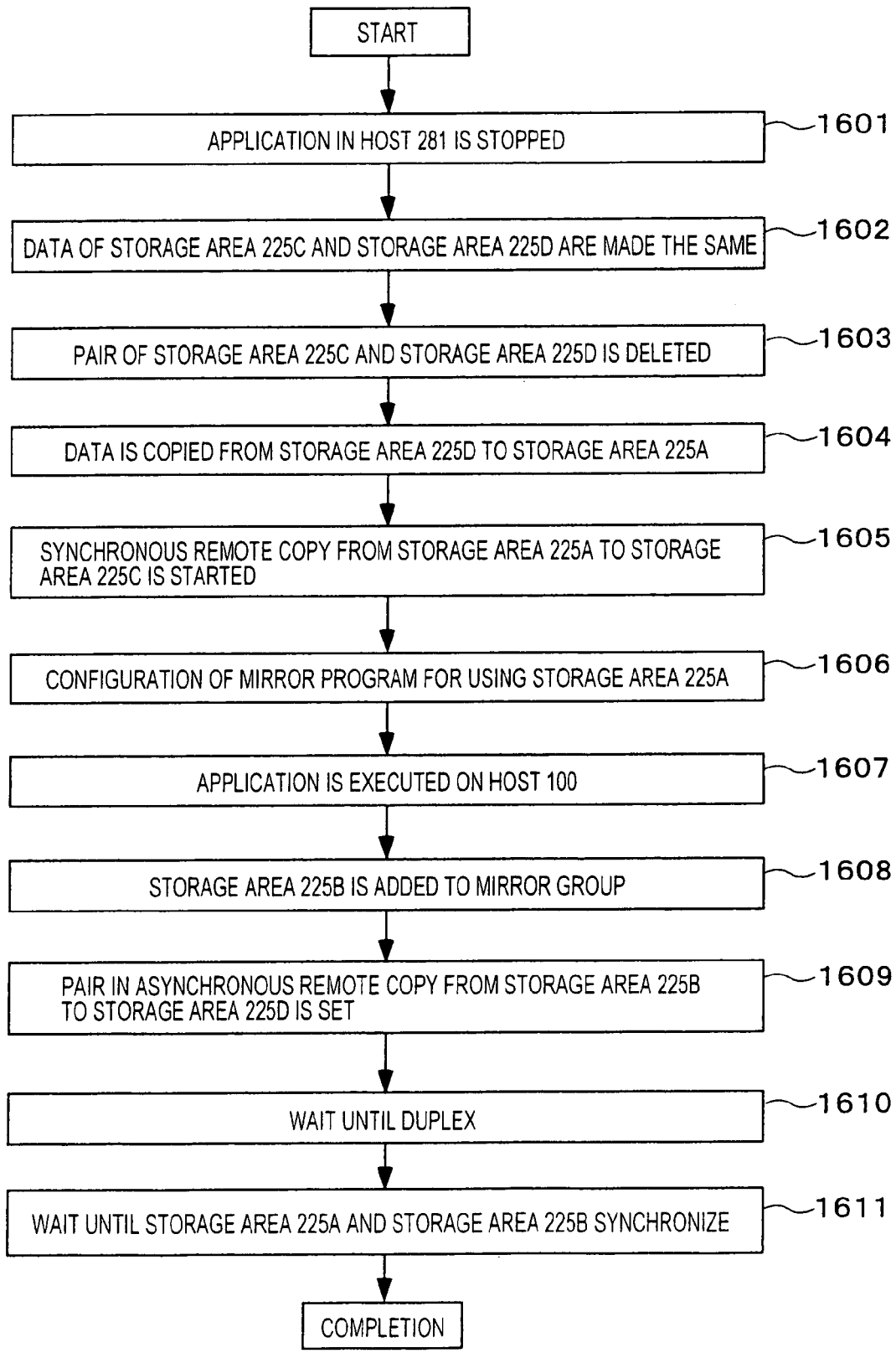
FIG. 16 is a flowchart showing a return procedure to a normal operation state when the primary site and the sync site are recovered after the application processing is resumed in the async site.

FIG. 16 is a view showing another procedure example in which after an application is resumed in the async site 180, the return is made to a normal operation state (execution of the application in the primary site).

The host 281 stops the application 201 (step 1601).

The host 281 instructs the storage subsystem 282 to change the pair state to the Simplex after the data of the storage area 225C and the storage area 225D are made identical to each other (steps 1602 and 1603).

The host 281 instructs the storage subsystem 282 to copy the data from the storage area 225D to the storage area 225A (step 1604).

Thereafter, the storage subsystem 120 starts the synchronous remote copy from the storage area 225A to the storage area 225C on the basis of the instruction of the host 110. Incidentally, since the storage area 225A and the storage area 225C have the same data, the initialization remote copy may be omitted (step 1605).

Since the configuration for using the storage area 225A does not exist in the host 110, the host 110 sets up a configuration to provide a mirror group including the storage area 225A as a virtual storage area to the application 201 (step 1606).

The application 201 of the host 110 is restarted, and the processing using the storage area 225A is resumed (step 1607).

The host 110 adds the storage area 225B to the mirror group of the step 1606 (step 1608).

The storage subsystem 120 starts the synchronous remote copy from the storage area 225B to the storage area 225D on the basis of the instruction of the host 110 (step 1609).

Waiting is performed until the data of the storage area 225B coincides with the data content of the storage area 225A and the pair state of the step 1609 becomes the Duplex (steps 1610 and 1611).

Incidentally, when the restart of the application at the step 1607 is carried out after the step 1609, the initialization copy of the step 1609 can be omitted. In that case, the copy of the storage area 225B is simultaneously performed once at the step 1604, and the initialization copy at the time of the addition of the step 1608 may be omitted.

Next, a processing in the case where the storage area 225A becomes unusable due to the occurrence of a failure or the like in the normal operation state will be described.

Figure 7:
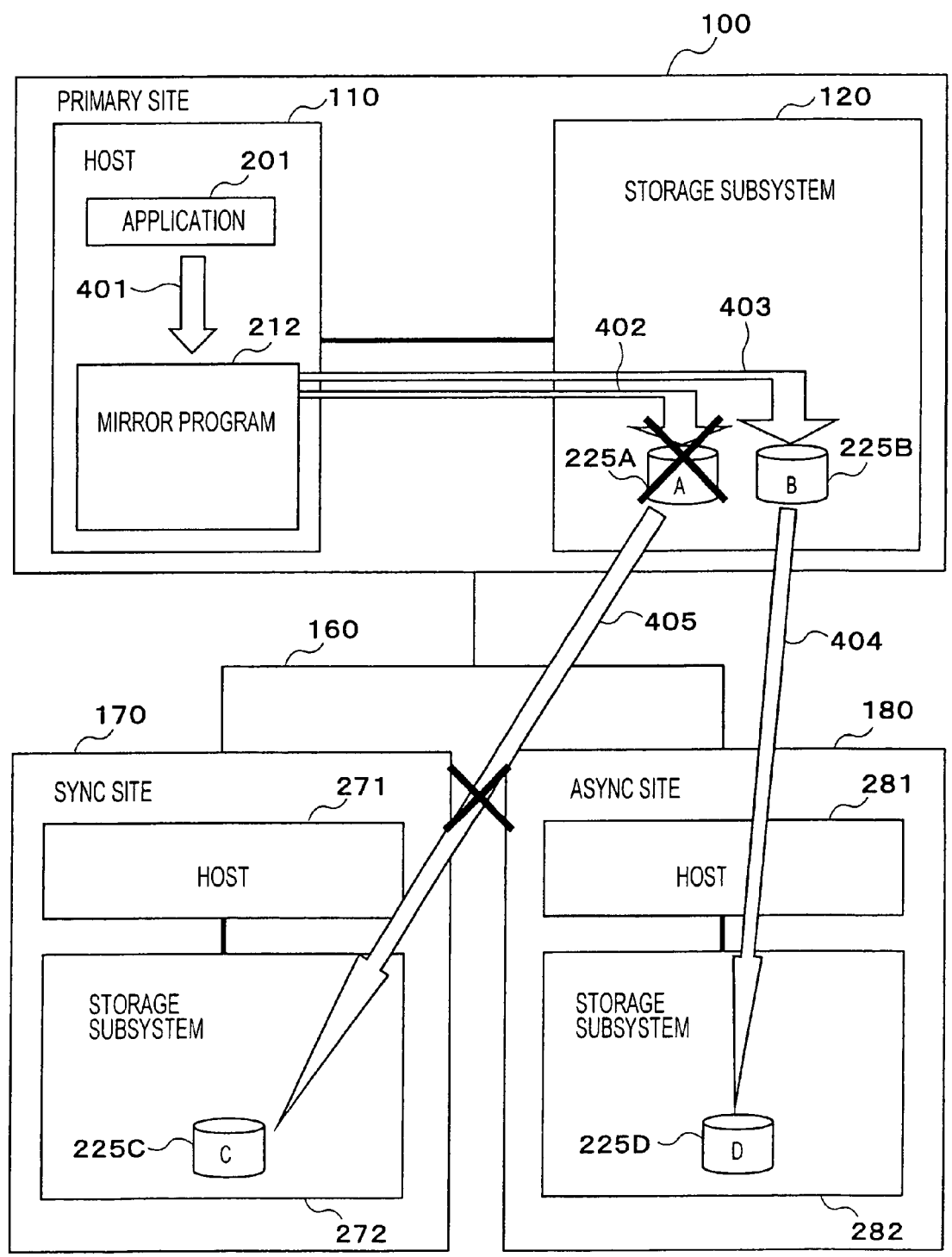
FIG. 7 is a block diagram showing a state where a failure occurs in a storage area corresponding to the sync site.

FIG. 7 is a view showing the outline of the processing in the case where the storage area 225A becomes unusable due to the occurrence of the failure or the like in the normal operation state.

In the case where the storage area 225A becomes unusable, the reflection of update data into the storage area 225C by the storage subsystem 120 is stopped. However, in the case where a failure protection configuration is not set, when the writing to the storage area 225B is normally terminated, the host 110 gives a normal termination message to the application 201. Thus, data of the storage subsystem 272 and the storage subsystem 282 do not coincide with each other, and specifically, data not existing in the storage subsystem 272 exist in the storage subsystems 120 and 282.

In order to resolve the foregoing disadvantage and to give priority to the prevention of data loss in the storage subsystem 272, in the case where the foregoing situation occurs, in this embodiment, a procedure to change a configuration to make the data reflected into the storage area 225C from the storage area 225B is carried out.

Figure 17:
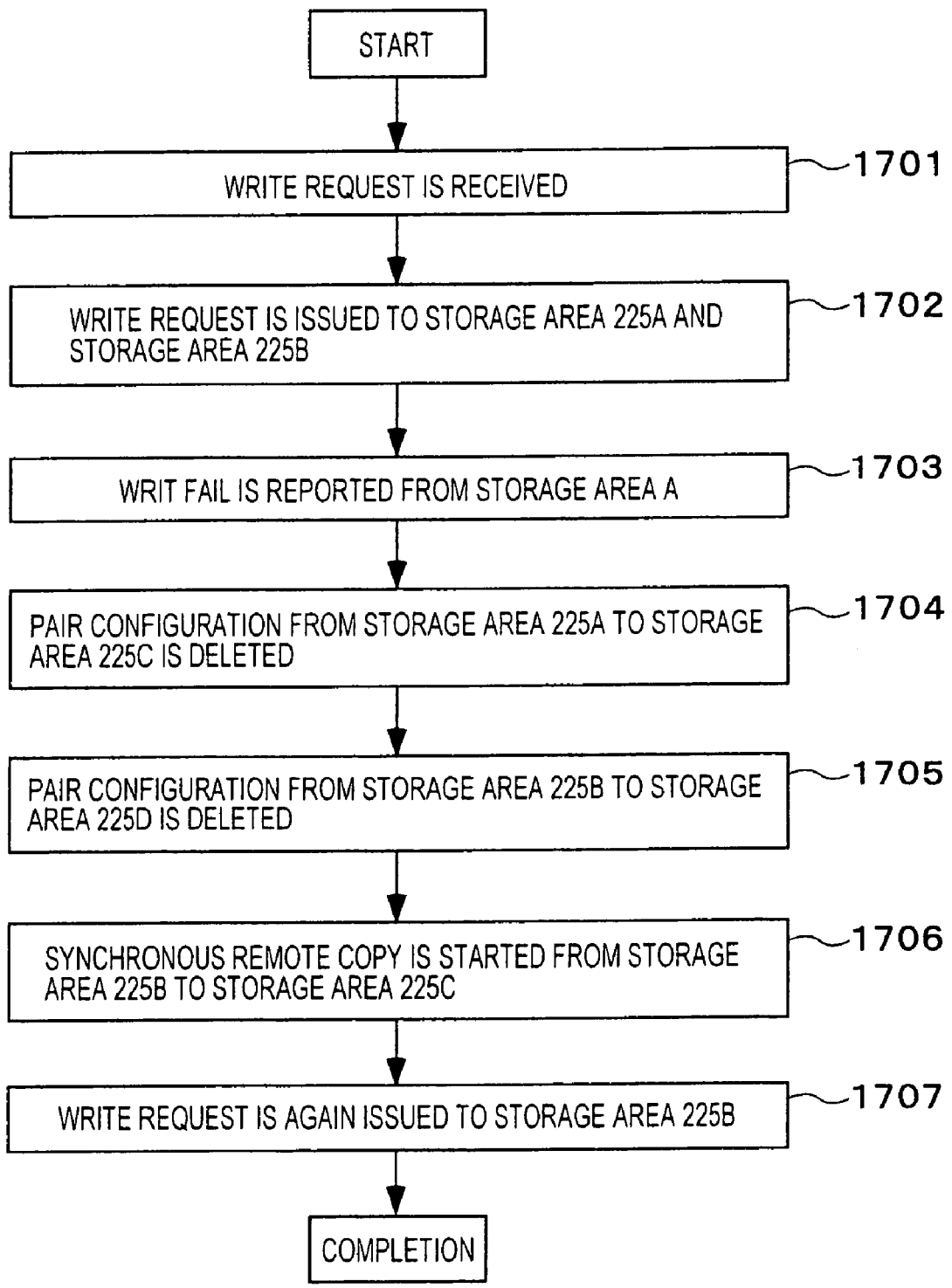
FIG. 17 is a flowchart showing a processing procedure for continuing a synchronous remote copy in a case where a failure occurs in a storage area A.

FIG. 17 is a view showing an example of a procedure to find the failure of the storage area 225A, to change the configuration, and to resume the synchronous remote copy.

The host 110 issues a write request to the storage area 225A and the storage area 225B on the basis of the write request in the application 201 (steps 1701 and 1702).

In this example, since the failure occurs in the storage area 225A, the storage subsystem 120 reports to the host 110 the write fail to the storage area 225A (step 1703).

The host 110 having received the write fail instructs the storage subsystem 120 to delete information of the pair state between the storage area 225A and the storage area 225C (step 1704). Besides, the host 110 instructs the storage subsystem 120 to change the pair state between the storage area 225B and the storage area 225D to the Simplex (step 1705).

The storage subsystem 120 starts the synchronous remote copy from the storage area 225B to the storage area 225C on the basis of the instruction of the host 110. Incidentally, since the updated data exists only in the storage area 225B, the contents of the data of the storage area 225B and the storage area 225C are not always identical to each other. However, also in this case, the initialization copy can be omitted by a procedure described below (step 1706).

In the case where the initialization copy is omitted at the step 1706, the host 110 again issues the write request to the storage area 225B, which was made at the step 1701, to the storage area 225B. In this processing, the contents of the data of the storage area 225B and the storage area 225C become identical to each other. Incidentally, the reissue of the write request may be performed by the host 110 on the basis of the execution of the mirror program 212, may be performed by the host 110 on the basis of the execution of the application 201, or may be performed by the host 110 on the basis of the execution of software other than that (step 1707).

Incidentally, in the case where the failure occurs in the sync site 170 during the execution of the step 1704 of the foregoing processing, there occurs a state in which the data of the storage area 225B is reflected in a portion of the storage area 225D, and there is a case where resumption of the application becomes impossible in the async site. As a countermeasure against this, it is conceivable that a backup of the storage area 225D is performed in the async site before the step 1704 is carried out.

Incidentally, in this embodiment, for simplification of the explanation, the application 201 uses only one storage area provided by the mirror program 212, however, this invention is not limited to this. Specifically, in the case where the application 201 uses two or more storage areas, plural pairs of the storage area 225A to the storage area 225D are prepared, and plural mirror groups are prepared. Besides, measures can be taken by repeating a processing, to which the storage areas relate, plural times except for the writing processing shown in FIG. 9.

Also in the case of the processing shown in FIG. 9, it is conceivable that the processing is repeated plural times the number of which is equal to the number of the pairs of the storage areas. However, in the case where any one of the plural storage areas 225A is write-protected by the failure Suspend, writing to the storage area 225A other than that is also rejected, so that the storage subsystem 120 can keep consistency from the viewpoint of all storage areas 225A. Accordingly, in this case, the number of storage areas handled by the processing of the step 907 or the step 912 of FIG. 9 is not made the number of storage areas belonging to one mirror group, but is regarded as the number of pairs of the plural storage areas 225A and the plural storage areas 225B. By this, it becomes possible to reduce the number of processing steps as compared with the case where the processing is repeated on all storage areas.

Besides, in this embodiment, the storage area 225A and the storage area 225B may exist in separate storage subsystems. In this case, the mirror program 212 transfers duplicates of data to different storage subsystems, respectively. Further, the mirror program 212 may exist in the storage subsystem 120. In this case, the system (especially the storage subsystem 120) performs the remote copy to the sync site 170 and the async site 180 in accordance with a procedure described below.

(1) A write request is sent from the host 110 to the storage subsystem 120.

(2) The mirror program 212 in the storage subsystem 120 performs writing to the storage area 225A and the storage area 225B in accordance with the write request.

(3) The synchronous remote copy program 222 receives the writing to the storage area 225A, and returns the write completion to the mirror program 212 after confirming that the write request is transferred to the storage area 225C of the sync site.

(4) On the other hand, the asynchronous remote copy program 223 makes the writing to the storage area 225B a log entry, and returns the write completion to the mirror program 212.

(5) The mirror program 212 returns the write completion to the host 110 after the write completions of both are returned.

(6) The asynchronous remote copy program 223 transfers the log entry to the async site, and makes the writing reflected in the storage area 225D while keeping the sequence relation.

In the case where the failure occurs in the primary site during the above operation, the system resumes the application in one of the sync site and the async site.

Incidentally, with respect to the configuration of the mirror group in this case, it is conceivable that an application for configuration is introduced to the host 110, and the administrator uses the application to set up the configuration, or the administrator sets up the configuration from the management terminal included in the storage subsystem 110.

Next, a second embodiment of the invention will be described.

Figure 18:
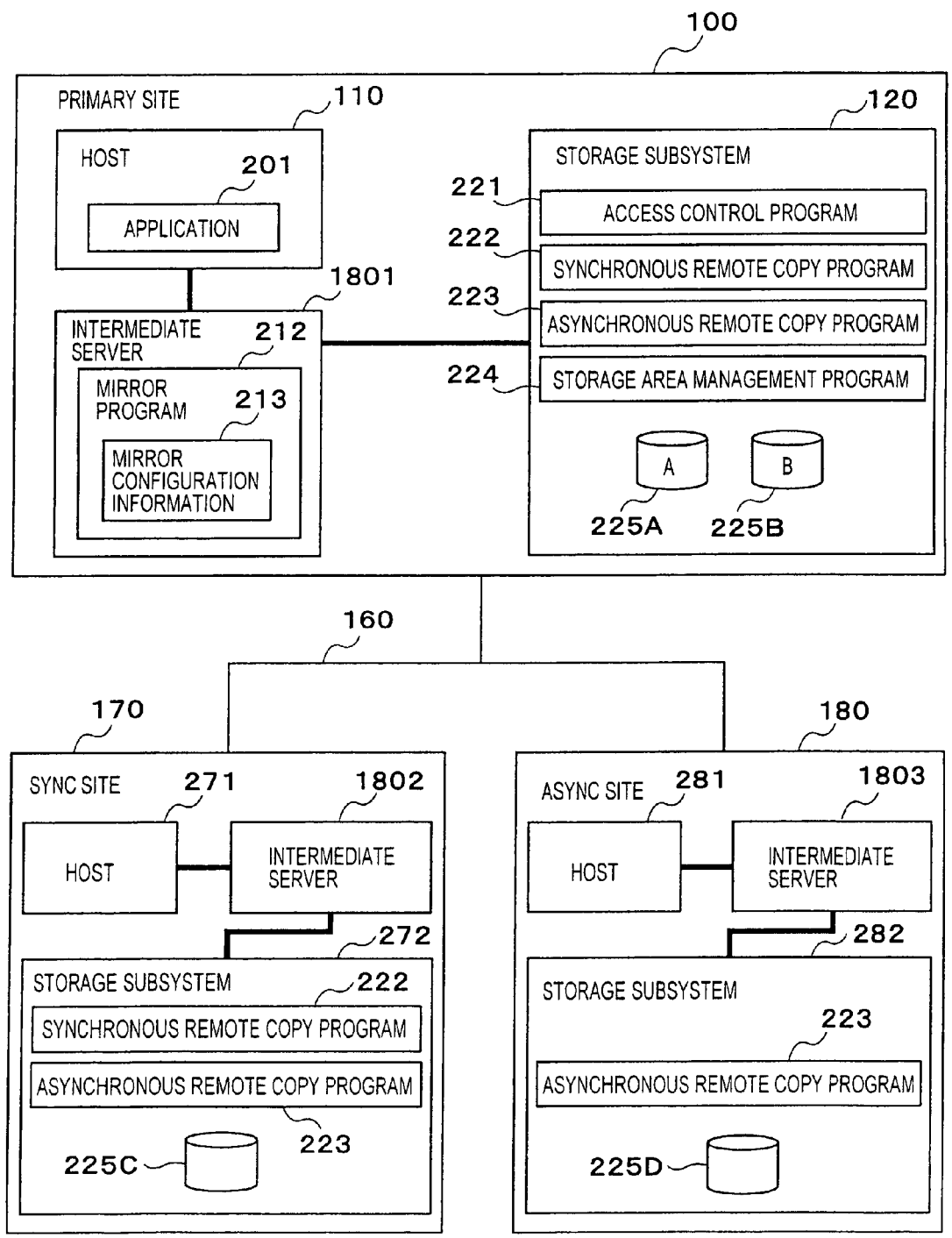
FIG. 18 is a block diagram showing a structural example of a second embodiment.

FIG. 18 is a view showing the outline of a system of the second embodiment. A different point between this embodiment and the first embodiment is that intermediate servers 1801, 1802, and 1803 are added to the respective sites. The intermediate server is a computer having a function to relay the I/O between a host of each site and a storage subsystem, and for example, it is conceivable to use a file server of NFS or CIFS, a virtualization server to provide a virtual volume, or the like.

Incidentally, the intermediate server may exist in a storage subsystem 120 or a host 110 (for example, as a network interface having ample functions). Especially, a mirror program 212 is stored in the intermediate server 1801 of the primary site 100, and the intermediate server 1801 executes the processing of mirroring which the host 110 executes in the first embodiment. By this, without adding any modification to the host 110, the processing described in the first embodiment becomes executable.

Incidentally, a network for connecting the hosts of the respective sites, the intermediate servers, and the storage subsystems may be any transfer medium or topology similarly to the first embodiment.

Next, a third embodiment in which the first embodiment is applied will be described.

Figure 19:
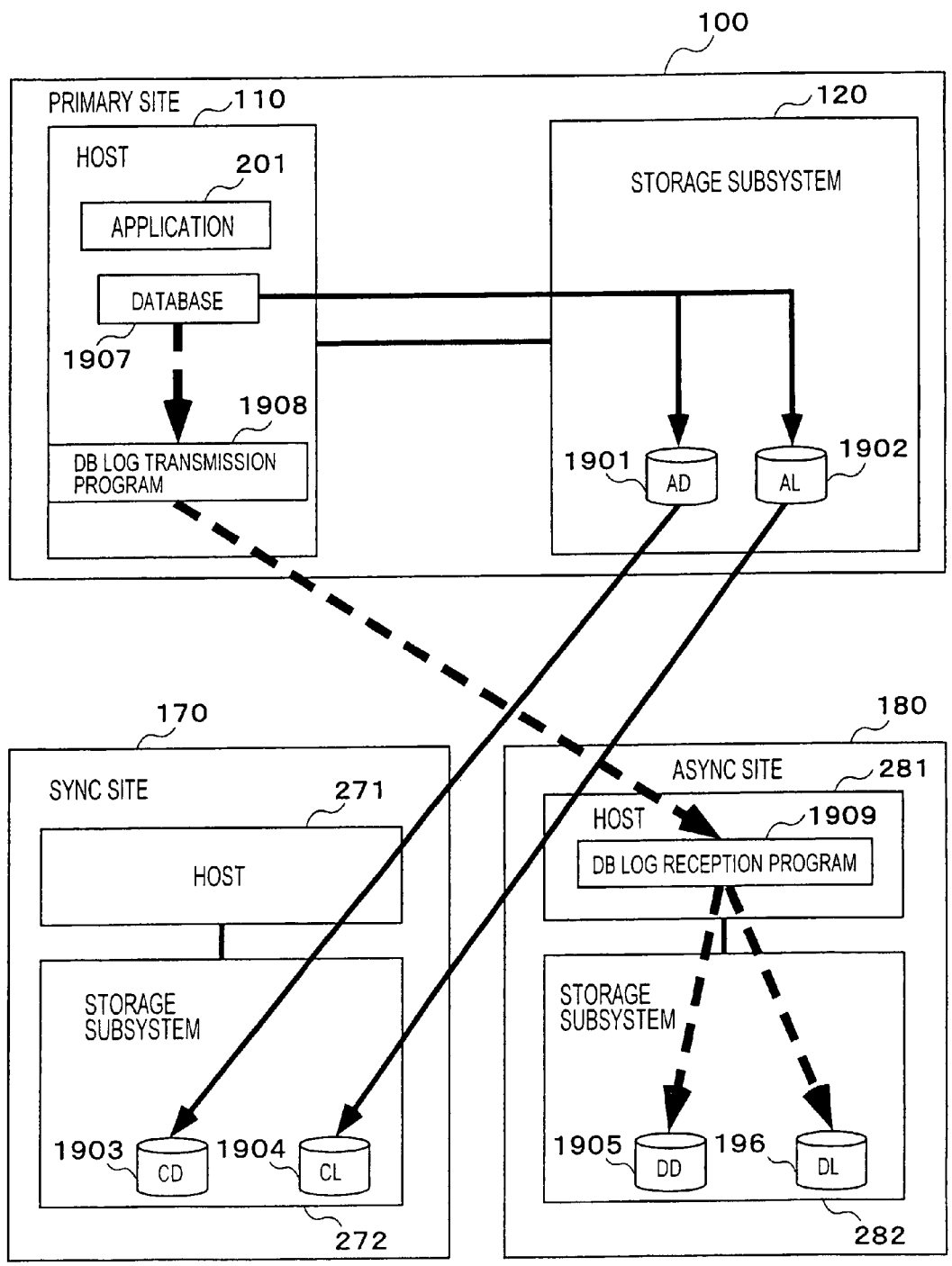
FIG. 19 is a block diagram showing a structural example of a third embodiment.

FIG. 19 is a block diagram showing the outline of a system of the third embodiment. Incidentally, in this drawing, although only portions necessary for the following description are shown and the remainder is omitted, also in this embodiment, various programs and hardware of the first embodiment exist. However, the asynchronous remote copy program 223 is not indispensable in this embodiment.

In the first and the second embodiments, although it is assumed that the asynchronous remote copy program exists in the storage subsystem, in this embodiment, the transfer of a log created by a database system is substituted for the asynchronous remote copy. Hereinafter, such a remote copy is called an asynchronous remote copy by a database.

A database 1907 is a program for controlling a database in which an application 201 requests a query processing. The host 110 carrying out the database 1907 always writes a log into a log storage area AL1902 included in the storage subsystem 120 when the query requested by the application 201 is completed (hereinafter referred to as "committed"). Besides, although not shown, the host 110 includes a buffer for a storage area AD1901 (storage area for storing a table) of the database 1907, and does not immediately write the update corresponding to the log, but writes it into the storage area AD1901.

Besides, the newest time of the query which is committed and in which the update content is already written in the storage area AL1902, specifically the newest time (or time slightly older than that) of the written log, together with the log, is managed in the database 1907. Accordingly, when the database is recovered, the host 110 starts the recovery processing from the log at this time. Besides, pre-change data and post-change data of data to be changed by the query are registered in the log.

Incidentally, in the database, instead of the foregoing time, a sequential ID may be used in which the foregoing time is assigned to each query, or both of these may be adopted as the information. Here, the case of the ID has a feature that if a rule is set such that continuous numbers are previously assigned, a missing number can be recognized. However, except for that, a difference does not exist even if which one is used, in the following description, the case where the time is used will be described.

A storage area CD1093 is a storage area which, together with the storage area AD1901, forms a pair in the synchronous remote copy. A storage area CL1094 is a storage area which, together with the storage area AL1902, forms a pair in the synchronous remote copy.

The host 110 executes a DB log transmission program 1908, and sends a log created by the processing of the database 1907 to the host 281 of the async site 180. Incidentally, at the time of the log transfer, the host 110 periodically extracts the log from the log storage area AL1902 and sends it to the host 281, however, in addition to this, the host 110 may directly transfer the data to the host 281 before the data is stored in the log storage area AL1902.

The host 281 receives the log transferred by the host 110 by carrying out a DB log reception program 1909, adds the log to a log storage area DL1906, and writes update data into a storage area DD1905. As already described, since one or both of the pre-change data and the post-change data of the data changed by the query exist in the log, when the async site 180 performs writing into the storage area D1905 on the basis of this log, the same processing as the asynchronous remote copy can be performed.

Incidentally, a method is conceivable in which instead of the transferred log, the query itself created in the application 201 is transferred and this query is again carried out on the host 281.

Incidentally, also in this embodiment, the same processings as the processings of FIGS. 10 to 16 described in the first embodiment are performed. However, in each processing, the storage area 225A is replaced by the storage area AD1901 and the log storage area AL1092, the storage area 225C is replaced by the storage area CD1903 and the log storage area CL1094, and the storage area 225D is replaced by the storage area DD1905 and the log storage area DL1096. Besides, in the respective processings of FIGS. 10 to 16, the processing relating to the mirror group and the data copy processing between the storage area 225A and the storage area 225B are deleted, and the other processing to which the storage area 225B relates is read as the storage area 225A.

Besides, although the description has been made such that the database 1907 uses two storage areas different from each other in the role, one storage area may be assigned to that, or three or more storage areas may be used.

Incidentally, with respect to the case where when the primary site is stopped by a failure, the execution of the application is resumed by creating the asynchronous remote copy between the sync site and the async site, the processing time of the initialization copy can be made shorter than that of the processing procedure described in FIG. 10 by using a method described below.

Figure 20:
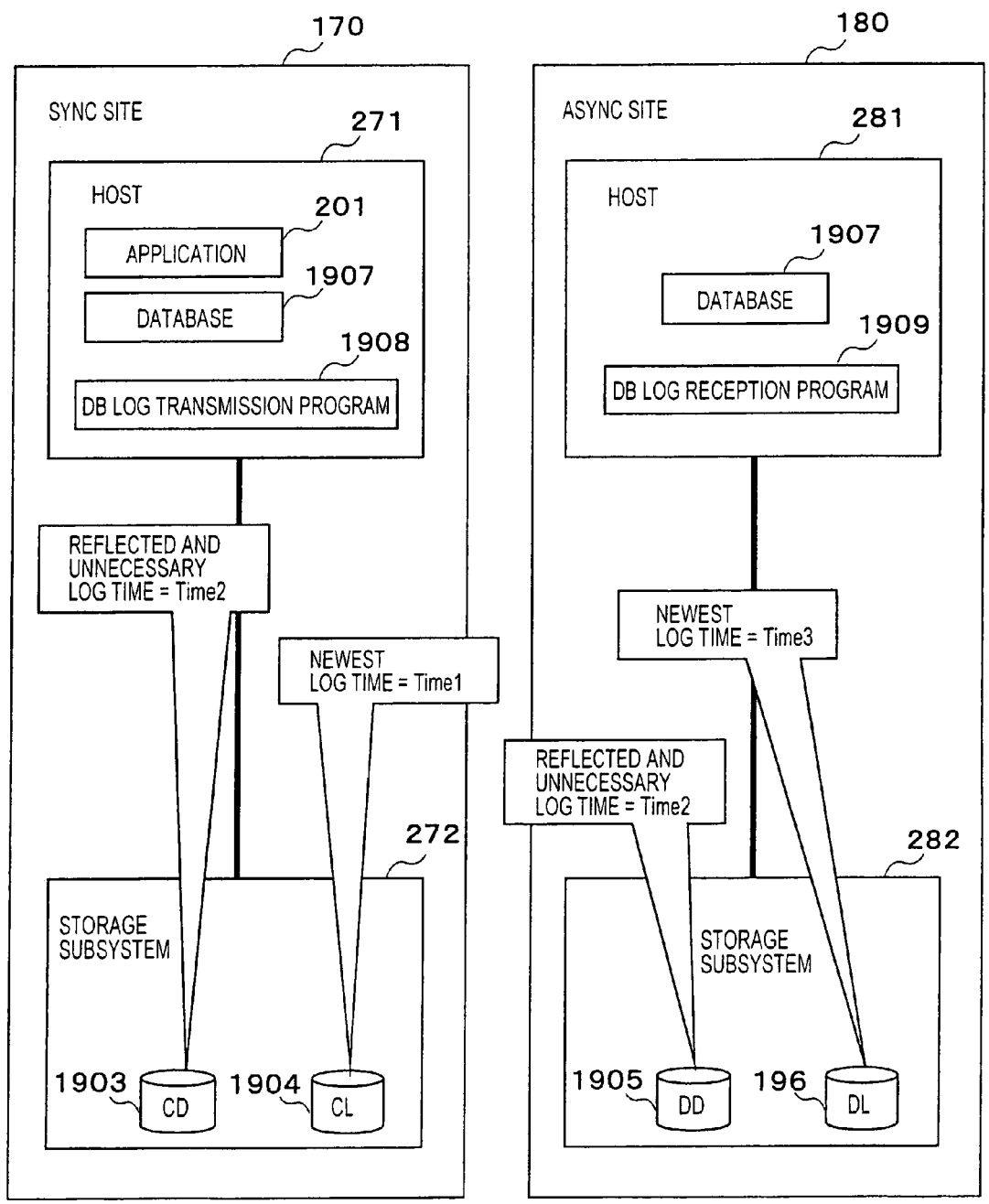
FIG. 20 is a block diagram showing a state after a primary site is stopped by failure in the third embodiment.

FIG. 20 is a view showing a state of the sync site 170 and the async site 180 in the case where the primary site is stopped by a failure at a time Time0.

First, since a log storage area CL1904 is always in the newest state by the synchronous remote copy 222, the following relation is established. Incidentally, in the following, a time of a newest log included in the log storage area CL1904 is TimeCLnew, a newest time (or slightly older than that) of a log which is reflected in a storage area CD1903 and becomes unnecessary is TimeCDNew, a time of a newest log included in a log storage area DL1906 is TimeDLNew, and a newest time (or slightly older than that) of a log which is reflected in a storage area DD1905 and becomes unnecessary is TimeDDNew.

(A) A query the execution of which was completed after the TimeCLNew does not exist.

(B) The TimeCLNew is the same time as the TimeCDNew or a newer time (since the database is first written in the log storage area).

(C) The TimeDLNew is the same time as the TimeDDNew or a newer time (since the database is first written in the log storage area).

(D) The TimeCLNew is the same time as the TimeDLNew or a newer time (since a copy from the primary site 100 to the async site 180 is performed asynchronously).

(E) The TimeCDNew is the same time as the TimeDDNew or a newer time (since a copy from the primary site 100 to the async site 180 is performed asynchronously).

Figure 21:
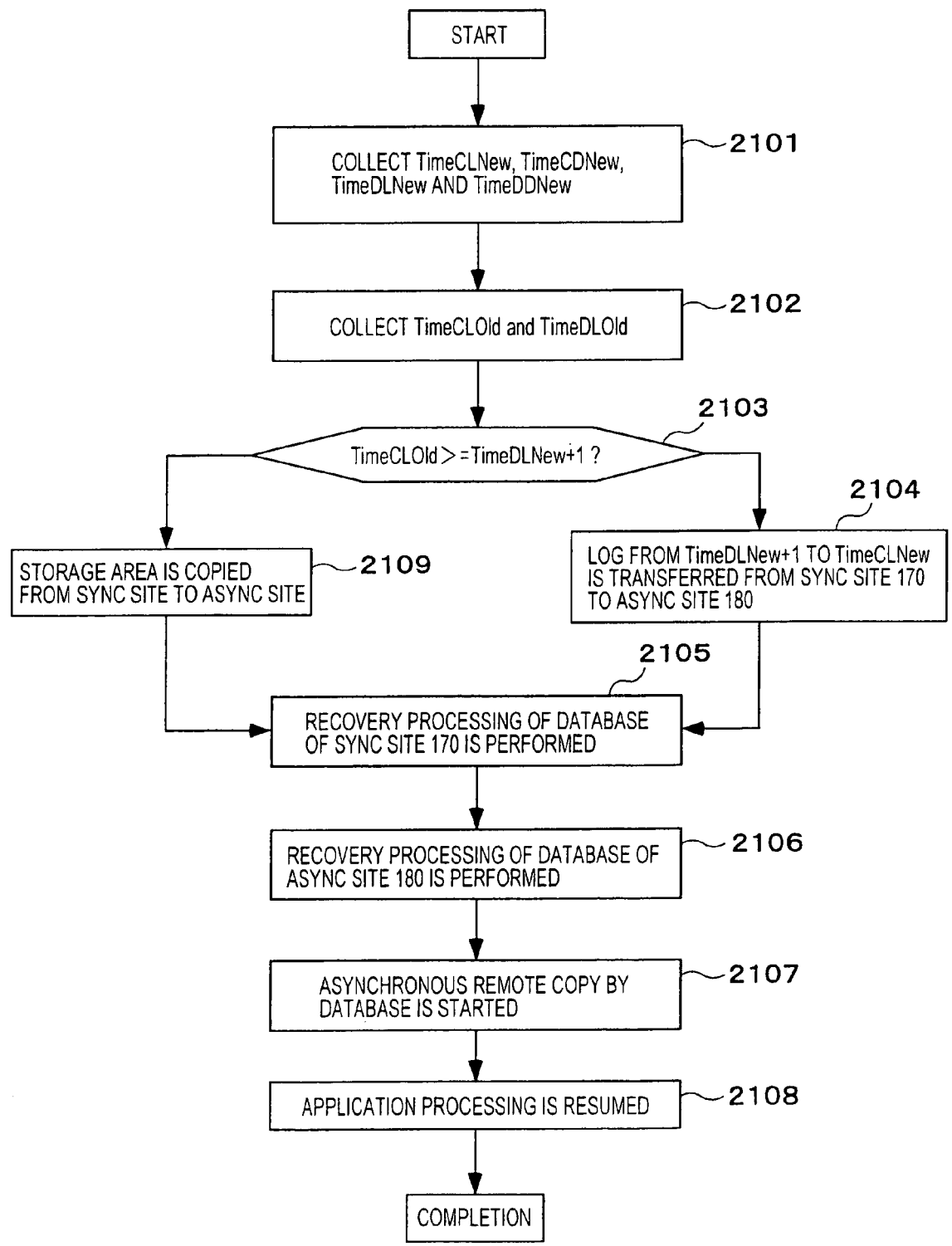
FIG. 21 is a view showing a procedure of resuming an application processing in the sync site when the primary site is stopped by failure in the third embodiment.

FIG. 21 is a view showing a procedure for performing the asynchronous remote copy by the database from the sync site 170 to the async site 180 in the state of FIG. 20.

The host 271 and the host 281 collect information of the TimeCLNew, TimeCDNew, TimeDLNew, and TimeDDNew (step 2101).

The host 271 and/or the host 281 collect information of an oldest time TimeCLOld of a log included in the log storage area CL1904, and an oldest time TimeDLOld of a log included in the log storage area DL1904 (step 2102).

Next, the host 271 or the host 281 compares the TimeCLOld with the TimeDLNew (step 2103).

In case the TimeCLOld is a time newer than the TimeDLNew by one, and specifically, it is the same as a time newer by one in a counter indicating the update sequence described before, or an older time, the sync site 170 transfers logs in a period from the time newer than the TimeDLNew by one to the TimeCLNew to the async site 180. By this, all logs existing in the sync site 170 exist also in the async site 180 (step 2104).

On the other hand, in the case where the TimeCLOld is a time newer than the TimeDLNew by two or more in the counter value, it means that part of the log to be transferred to the async site 180 is already deleted in the sync site, and accordingly, the storage subsystem 272 copies the log storage area CL1904 to the log storage area DL1906, and copies the storage area CD1903 to the storage area DD1905 (step 2109).

After the step 2104 or the step 2109 is ended, the recovery processing of the database 1907 is performed in the sync site 170. In general, in the database, the recovery processing is performed using the logs. Specifically, the logs stored in the log storage area are applied to the data of the database in sequence of date, and after the logs are applied to the last, with respect to the log relating to a query which is not committed, rollback is performed (step 2105).

In the async site, the recovery processing similar to the step 2105 is carried out (step 2106).

The host 271 or the host 281 starts the asynchronous remote copy by the database from the sync site 170 to the async site 180 (step 2107).

The database 1907, together with the application 201, resumes the processing (step 2108).

Incidentally, for reduction of the quantity of copy, with respect to the data copy between the log storage areas, a method is conceivable in which the logs included in the log storage area CL1904 and the log storage area DL1906 are compared, and only the log which is not included in the log storage area DL1906 (and only in the period necessary for the recovery processing) is transferred. Besides, in each page constituting a table stored in the storage area, information indicating the newest log applied to that page is sometimes included, and it is conceivable that this is compared between sites, and only a page having a difference is copied.

Besides, in the case where after the newest data is copied from the sync site 170 to the async site 180 and recovery is performed in the async site, the processings up to the step 2106 are carried out as they are, and in the subsequent processings, the relation of the sync site 170 and the async site 180 is reversed, so that it becomes possible to deal with the case.

Next, a fourth embodiment will be described. In this embodiment, similarly to the other embodiments, the synchronous remote copy is performed in the storage subsystem, and the asynchronous remote copy is realized by software on the host. Further, in this embodiment, the host 110 uses a journal file system 2202 to shorten a time taken to perform an initialization copy of an asynchronous remote copy between a storage area 225C and a storage area 225D performed in a recovery processing when the primary site is stopped by a failure.

Figure 22:
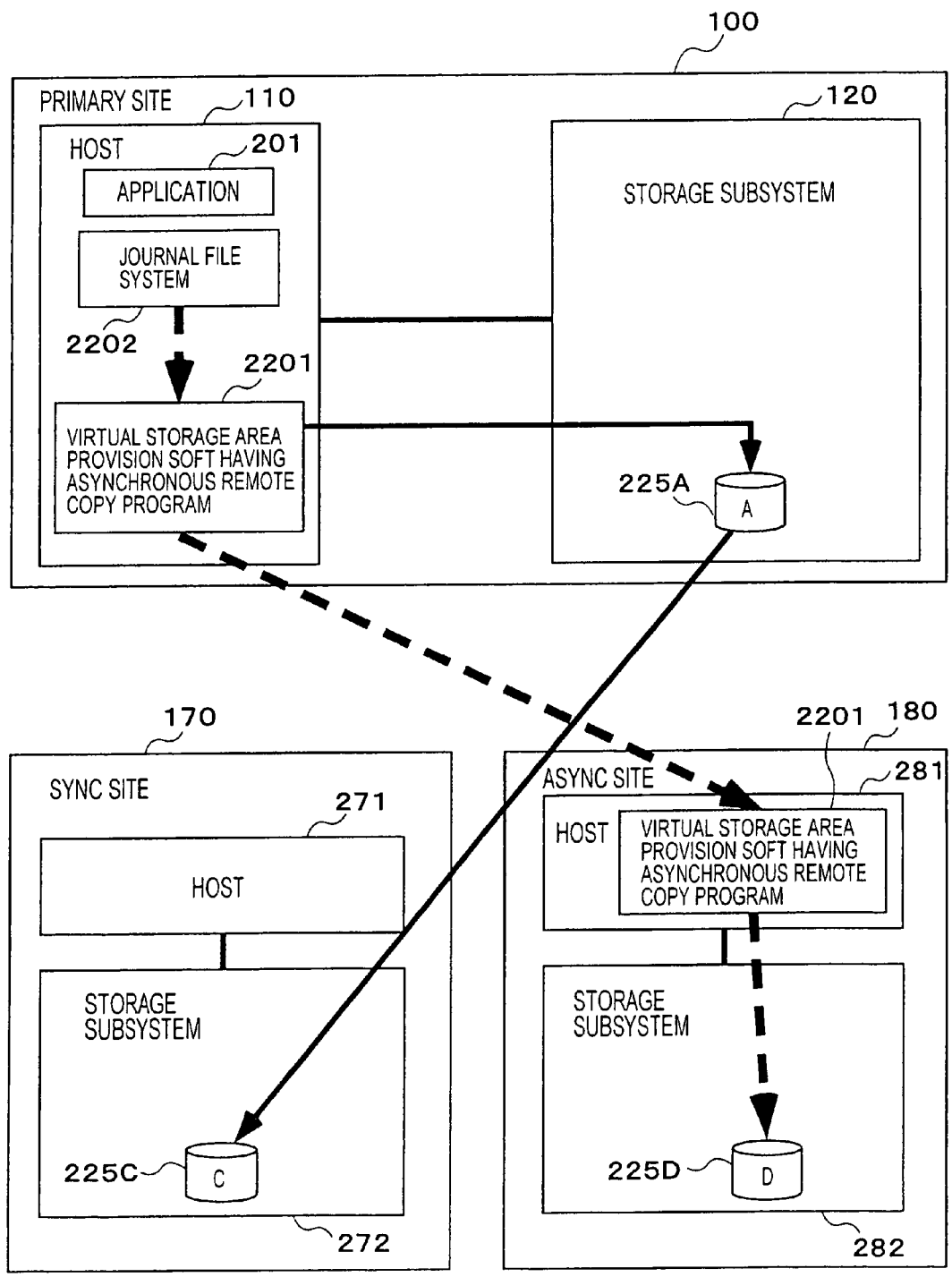
FIG. 22 is a block diagram showing a structural example of a fourth embodiment.

FIG. 22 is a block diagram showing the outline of a structure of this embodiment.

The host 110 executes a virtual storage area provision program 2201 having an asynchronous remote copy function and receives a write request from the file system 2202 or an application 201, and after holding the write data and time sequence information together as an entry, the host performs a write processing to a storage area 225A. Besides, the host 110 executes the program 2201, and sends the created entry to a host 281, and with respect to the same program of the host 281, the host performs a processing to cause the write data to be reflected in the storage area from the received entry.

The journal file system 2202 is a file system for holding a change of metadata existing for each file of a file system in the form of a log on a storage area, and is a file system in which shortening of a time of metadata check of the file system at the time of a host failure is realized. Incidentally, although it is conceivable that an area (metadata log area) for storing a log of metadata is assigned to a specified range of the storage area, the metadata log area may be extensible. In any cases, when writing is performed to the metadata area, similar write data exist also in the storage area 225C by the synchronous remote copy.

Further, in the case where a file is updated, it is conceivable that the opportunity to update the metadata includes file opening, closing, update of cached block data, and update of block data on the storage area. However, when the update of the metadata is performed even once between the opening of the update object file to the closing, it is not necessary that the processing of updating the metadata is always performed in the case where the above condition occurs, and the update may be performed at an opportunity other than this. Besides, the update of the metadata on the storage area other than the metadata log area may be performed at the same time as the update of the metadata log area, or may be performed asynchronously.

Hereinafter, a description will be made on how an update processing of a file is performed in this embodiment.

(1) The application opens a file with write permission.

(2) The data is updated. The journal file system 2202 sends a block write request to the virtual storage area provision program 2201 having the asynchronous remote copy function through a buffer cache. The host 110 executes the virtual storage area provision program 2201 having the asynchronous remote copy function, issues a write request to the storage area 225A, creates an entry and stores it in the host 110. Thereafter, the virtual storage area provision program 2201 having the asynchronous remote copy function sends a write completion message to the journal file system.

(3) The storage subsystem 120 executes the synchronous remote copy program 222 and causes the update data written in the storage area 225A to be reflected in the storage area 225C.

(4) The host 110 executes the virtual storage area provision program 2201 having the asynchronous remote copy function, transfers the entry created at the above paragraph (2) to the async site 180, and deletes the entry after the transfer is completed.

(5) The async site 180 executes the virtual storage area provision program 2201 having the asynchronous remote copy function, and causes the update data to be reflected in the storage area 225D while keeping the sequence on the basis of the received entry.

(6) The application 201 closes the file. At this stage, the update of the metadata has been performed at least once. The update procedure at that time proceeds along the following steps (A) to (D) with respect to both the metadata in the metadata log area and the metadata other than that, and the data is transmitted to the sync site 170 and the async site 180.

(A) The host 110 updates the metadata. The journal file system 2202 sends the block write request to the virtual storage area provision program 2201 having the asynchronous remote copy function. The host 110 executes the virtual storage area provision program 2201 having the asynchronous remote copy function, issues a write request to the storage area 225A, creates an entry and holds it on the host 110. Thereafter, the virtual storage area provision program 2201 having the asynchronous remote copy function sends a write completion message to the journal file system.

(B) The storage subsystem 120 executes the synchronous remote copy program 222, and causes the update metadata written in the storage area 225A to be reflected in the storage area 225C.

(C) The host 110 executes the virtual storage area provision program 2201 having the asynchronous remote copy function, transfers the entry created at the step (A) to the async site 180, and deletes the entry when the transfer is completed.

(D) The host 281 of the async site 180 executes the virtual storage area provision program 2201 having the asynchronous remote copy function, and causes the update metadata to be reflected in the storage area 225D while keeping the sequence on the basis of the received entry.

Incidentally, since the metadata log area can be insufficient in capacity according to circumstances, it is necessary to delete the log of old metadata. In this embodiment, the log of the metadata is deleted by the following steps, so that it is guaranteed that the file the log of which does not exist in the metadata log area has the same data in the storage area C227 and the storage area D228.

(1) The journal file system 2202 determines a log to be deleted.

(2) In case the log of the delete object relates to the same file as the other log, the log of the delete object is deleted and the processing is ended.

(3) In case the log of the delete object does not relate to the same file as the other log, the journal file system 2202 obtains a block address of a storage area (metadata may not be made the object) relating to this file.

(4) A search is performed for the entry created by the execution of the virtual storage area provision program 2201 having the asynchronous remote copy function of the primary site 100, and waiting is performed until the entry to update the block address obtained at the step (3) does not exist in the primary site 100.

(5) The log of the delete object is deleted.

In this embodiment, a procedure of performing the asynchronous remote copy by the virtual storage area provision program 2201 having the asynchronous remote copy function from the sync site 170 to the async site 180 in the recovery processing at the time of the failure stop of the primary site 100 is as follows.

(1) A search is performed for the log existing in the metadata log area of the storage area 225C of the sync site 170, and a list of files in which the update occurs is obtained.

(2) The host 271 instructs the storage subsystem 272 to copy the data of the file obtained at the above processing (1) from the storage area 225C to the storage area 225D.

(3) The asynchronous remote copy by the database from the sync site 170 to the async site 180 is started.

(4) The processing of the application 201 is resumed in the sync site 170.

Besides, in this embodiment, in the case where the newest data is copied from the sync site 170 to the async site 180 and then, a recovery is made in the async site, the processings up to the processing (3) among the foregoing processings are carried out as they are, and the relation of the sync site 170 and the async site 180 has only to be reversed in the subsequent processing.

In all the foregoing embodiments, since the transmission of the update data to the async site 180 at the time of the normal operation is continuously performed by the asynchronous remote copy, the quantity of the update data lost in the case where both the primary site and the sync site are stopped by a failure becomes small.

Besides, since the storage subsystem does not have a specific function, and can realize the synchronous remote copy and the asynchronous remote copy of the same data by using plural storage areas, this invention can be applied to a wide storage subsystem.

According to this invention, the quantity of the update data lost in the case where both the primary site and the sync site are stopped by a failure can be made small.

What is claimed is:

1. A system comprising:
a first storage system;
a second storage system; and
a third storage system,
wherein data to be stored in the first storage system is duplicated to store the data to be stored in a first storage area and to store the duplicate of the data to be stored in a second storage area,
wherein the first and second storage areas are included in the first storage system,
wherein update data of the first storage area is transferred from the first storage area of the first storage system to the second storage system by synchronous remote copy, and
wherein update data of the second storage area is transferred from the second storage area of the first storage system to the third storage system by asynchronous remote copy.

2. A system comprising:
a first storage system;
a second storage system; and
a third storage system,
wherein data in the first storage system is duplicated to store data in first and second storage areas,
wherein the first and second storage areas are included in the first storage system,
wherein update data of the first storage area is transferred from the first storage area of the first storage system to the second storage system by synchronous remote copy,
wherein update data of the second storage area is transferred from the second storage area of the first storage system to the third storage system by asynchronous remote copy,
wherein, in a case where a failure occurs in the first storage system, performing of processes, which have been performed by the computer included in the first storage system, is continued by the second storage system, and the update data of a storage area of the second storage system is transferred to the third storage system.

3. A system according to claim 2, wherein, in a case where the first storage system is recovered, the performing of processes, which have been performed by the computer of the second storage system, is continued by the first storage system, wherein the data stored in the second storage system is transferred to the first storage system, and wherein processings of the duplication, the synchronous remote copy and the asynchronous remote copy are resumed in the first storage system.

4. A system according to claim 2, wherein, in a case where the first storage system is recovered, the performing of processes, which have been performed by the second storage system, is continued by the first storage system, wherein the data stored in the third storage system is transferred to the first storage system, and wherein performing of processes of duplication, synchronous remote copy and asynchronous remote copy is resumed in the first storage system.

5. A system comprising:

a first storage system;

a second storage system; and a third storage system, wherein data in the first storage system is duplicated to store data in first and second storage areas, wherein the first and second storage areas are included in the first storage system, wherein update data of the first storage area is transferred from the first storage area of the first storage system to the second storage system by synchronous remote copy, wherein update data of the second storage area is transferred from the second storage area of the first storage system to the third storage system by asynchronous remote copy, wherein, in a case where a failure occurs in the first storage system, performing of processes, which have been performed by the first storage system, is continued by the third storage system, wherein the data stored in the second storage system is transferred to the third storage system and contents of the data of the second and the third storage systems is made to coincide with each other, and wherein content of data update into the third storage system is transferred to the second storage system.

6. A system comprising:

a first storage system;

a second storage system; and a third storage system, wherein data in the first storage system is duplicated to store data in first and second storage areas, wherein the first and second storage areas are included in the first storage system, wherein update data of the first storage area is transferred from the first storage area of the first storage system to the second storage system by synchronous remote copy, wherein update data of the second storage area is transferred from the second storage area of the first storage system to the third storage system by an asynchronous remote copy, wherein, in a case where a failure occurs in the first storage system, performing of processes, which have been performed by the first storage system, is continued by the third storage system, and wherein content of data update into the third storage system is transferred to the second storage system.

7. A system according to claim 6, wherein, in a case where the first storage system is recovered, the performing of processes, which have been performed by the third storage system, is continued by the first storage system, wherein the data stored in the third storage system is transferred to the first storage system, and wherein performing of processes of the duplication, the synchronous remote copy and the asynchronous remote copy is resumed in the first storage system.

8. A system according to claim 6, wherein, in a case where the first storage system is recovered, the performing of processes, which have been performed by the third storage system, is continued by the first storage system, wherein the data stored in the second storage system is transferred to the first storage system, and wherein performing of processes, including the duplication, the synchronous remote copy and the asynchronous remote copy, is resumed in the first storage system.

\* \* \* \* \*